United States Patent
Lopes et al.

(10) Patent No.: US 9,632,647 B1
(45) Date of Patent: Apr. 25, 2017

(54) SELECTING PRESENTATION POSITIONS IN DYNAMIC CONTENT

(71) Applicant: Audible, Inc., Newark, NJ (US)

(72) Inventors: Will Lopes, Newark, NJ (US); Ajay Arora, New York, NY (US); Steven C. Dzik, Somerset, NJ (US); Alexander Galkin, East Brunswick, NJ (US); Guy A. Story, Jr., New York, NY (US); Mugur F. Tolea, Flemington, NJ (US)

(73) Assignee: Audible, Inc., Newark, NJ (US)

( * ) Notice: Subject to any disclaimer, the term of this patent is extended or adjusted under 35 U.S.C. 154(b) by 418 days.

(21) Appl. No.: 13/648,236

(22) Filed: Oct. 9, 2012

(51) Int. Cl.
G06F 3/048 (2013.01)

(52) U.S. Cl.
CPC .................................. G06F 3/048 (2013.01)

(58) Field of Classification Search
CPC ........... H04N 21/4828; H04N 21/8126; H04N 21/8133; G06F 17/2785; G06F 17/30017; G06F 3/167; G06F 3/0483
USPC ........................................................ 715/728
See application file for complete search history.

(56) References Cited

U.S. PATENT DOCUMENTS

| | | | |
|---|---|---|---|
| 5,203,705 A | 4/1993 | Hardy et al. | |
| 5,351,189 A | 9/1994 | Doi et al. | |
| 5,657,426 A | 8/1997 | Waters et al. | |
| 5,737,489 A | 4/1998 | Chou et al. | |
| 5,978,754 A | 11/1999 | Kumano | |
| 6,076,059 A | 6/2000 | Glickman et al. | |
| 6,208,956 B1 | 3/2001 | Motayama | |
| 6,256,610 B1 | 7/2001 | Baum | |
| 6,260,011 B1 | 7/2001 | Heckerman et al. | |
| 6,356,922 B1 | 3/2002 | Schilit et al. | |
| 6,638,171 B1 | 10/2003 | Igarashi et al. | |
| 6,766,294 B2 | 7/2004 | MaGinite et al. | |
| 6,912,505 B2 | 6/2005 | Linden et al. | |
| 7,003,515 B1 | 2/2006 | Glaser et al. | |
| 7,107,533 B2 | 9/2006 | Duncan et al. | |
| 7,210,102 B1 | 4/2007 | Gordon et al. | |
| 7,231,351 B1 | 6/2007 | Griggs | |

(Continued)

FOREIGN PATENT DOCUMENTS

| | | |
|---|---|---|
| CN | 103988193 A | 8/2014 |
| CN | 104662604 A | 5/2015 |

(Continued)

OTHER PUBLICATIONS

Office Action in Japanese Application No. 2014-501257 dated Aug. 25, 2014.

(Continued)

*Primary Examiner* — Maryam Ipakchi
(74) *Attorney, Agent, or Firm* — Knobbe, Martens, Olson & Bear, LLP

(57) ABSTRACT

Digital items of dynamic content may be navigated by content elements associated with the item of dynamic content. In some embodiments, a voice command or natural language query is obtained from a user to whom the item of dynamic content is being presented. The voice command or natural language query may be processed to identify a content element to which the user wishes to navigate. The item of dynamic content may then be presented starting at a presentation position at or near a presentation position with which the content element is associated.

21 Claims, 12 Drawing Sheets

(56) References Cited

U.S. PATENT DOCUMENTS

| | | | |
|---|---|---|---|
| 7,870,272 B2* | 1/2011 | Berkowitz | G06F 17/30017 709/217 |
| 8,106,285 B2 | 1/2012 | Gerl et al. | |
| 8,109,765 B2 | 2/2012 | Beattie et al. | |
| 8,131,545 B1 | 3/2012 | Moreno et al. | |
| 8,131,865 B2 | 3/2012 | Rebaud et al. | |
| 8,150,864 B2 | 4/2012 | Williams et al. | |
| 8,317,606 B2 | 11/2012 | Graham et al. | |
| 8,442,423 B1 | 5/2013 | Ryan et al. | |
| 8,504,906 B1 | 8/2013 | Xu | |
| 8,512,042 B2 | 8/2013 | Rogan et al. | |
| 8,527,272 B2 | 9/2013 | Qin et al. | |
| 8,548,618 B1 | 10/2013 | Story, Jr. et al. | |
| 8,577,668 B2 | 11/2013 | Rosart et al. | |
| 8,798,366 B1 | 8/2014 | Jones et al. | |
| 8,855,797 B2 | 10/2014 | Story, Jr. et al. | |
| 8,861,925 B1* | 10/2014 | Ohme | H04N 5/932 386/207 |
| 8,862,255 B2 | 10/2014 | Story, Jr. et al. | |
| 8,948,892 B2 | 2/2015 | Story, Jr. et al. | |
| 9,037,956 B2 | 5/2015 | Goldstein et al. | |
| 9,099,089 B2 | 8/2015 | Dzik et al. | |
| 2002/0002459 A1 | 1/2002 | Lewis et al. | |
| 2002/0007349 A1 | 1/2002 | Yuen | |
| 2002/0041692 A1 | 4/2002 | Seto et al. | |
| 2002/0046023 A1 | 4/2002 | Fuji et al. | |
| 2002/0054073 A1* | 5/2002 | Yuen | G06F 17/30746 715/727 |
| 2002/0116188 A1 | 8/2002 | Amir et al. | |
| 2002/0184189 A1 | 12/2002 | Hay et al. | |
| 2003/0023442 A1 | 1/2003 | Akabane et al. | |
| 2003/0061028 A1 | 3/2003 | Dey et al. | |
| 2003/0077559 A1 | 4/2003 | Braunberger et al. | |
| 2003/0083885 A1 | 5/2003 | Frimpong-Ansah | |
| 2003/0115289 A1* | 6/2003 | Chinn et al. | 709/219 |
| 2004/0261093 A1 | 12/2004 | Rebaud et al. | |
| 2005/0005308 A1* | 1/2005 | Logan | G06Q 30/06 725/135 |
| 2005/0022113 A1* | 1/2005 | Hanlon | 715/511 |
| 2005/0086211 A1 | 4/2005 | Mayer | |
| 2005/0131559 A1* | 6/2005 | Kahn | G10L 15/26 700/94 |
| 2005/0187910 A1* | 8/2005 | Kladko | B42D 3/12 |
| 2006/0122984 A1* | 6/2006 | Byers | G06F 17/30265 |
| 2006/0148569 A1 | 7/2006 | Beck | |
| 2006/0190559 A1* | 8/2006 | Lim | 709/217 |
| 2007/0005651 A1 | 1/2007 | Levien et al. | |
| 2007/0016314 A1 | 1/2007 | Chan et al. | |
| 2007/0061487 A1 | 3/2007 | Moore et al. | |
| 2007/0074619 A1 | 4/2007 | Vergo | |
| 2007/0124298 A1* | 5/2007 | Agrawal | G06F 17/30991 |
| 2007/0136459 A1 | 6/2007 | Roche et al. | |
| 2007/0219968 A1* | 9/2007 | Frank | 707/3 |
| 2007/0219983 A1* | 9/2007 | Fish | 707/5 |
| 2007/0255565 A1* | 11/2007 | Yu | G06F 17/30038 704/251 |
| 2007/0276657 A1 | 11/2007 | Gournay et al. | |
| 2007/0282844 A1 | 12/2007 | Kim et al. | |
| 2008/0005656 A1 | 1/2008 | Pang et al. | |
| 2008/0021894 A1* | 1/2008 | Styles | 707/5 |
| 2008/0027726 A1 | 1/2008 | Hansen et al. | |
| 2008/0039163 A1 | 2/2008 | Eronen et al. | |
| 2008/0141126 A1 | 6/2008 | Johnson et al. | |
| 2008/0163039 A1* | 7/2008 | Ryan et al. | 715/206 |
| 2008/0177822 A1 | 7/2008 | Yoneda | |
| 2008/0243828 A1* | 10/2008 | Reztlaff et al. | 707/5 |
| 2008/0270138 A1* | 10/2008 | Knight | G06F 17/30026 704/260 |
| 2008/0294453 A1 | 11/2008 | Baird-Smith et al. | |
| 2009/0006336 A1 | 1/2009 | Forstall et al. | |
| 2009/0047003 A1 | 2/2009 | Yamamoto | |
| 2009/0124272 A1 | 5/2009 | White et al. | |
| 2009/0136213 A1 | 5/2009 | Calisa et al. | |
| 2009/0165634 A1 | 7/2009 | Mahowald | |
| 2009/0210213 A1 | 8/2009 | Cannon et al. | |
| 2009/0222520 A1 | 9/2009 | Sloo et al. | |
| 2009/0228570 A1 | 9/2009 | Janik et al. | |
| 2009/0233705 A1 | 9/2009 | Lemay et al. | |
| 2009/0276215 A1 | 11/2009 | Hager | |
| 2009/0281645 A1 | 11/2009 | Kitahara et al. | |
| 2009/0282093 A1 | 11/2009 | Allard et al. | |
| 2009/0305203 A1 | 12/2009 | Okumura et al. | |
| 2009/0319273 A1 | 12/2009 | Mitsui et al. | |
| 2010/0042682 A1 | 2/2010 | Kaye | |
| 2010/0042702 A1 | 2/2010 | Hanses | |
| 2010/0049349 A1* | 2/2010 | Deng | G11B 20/10527 700/94 |
| 2010/0064218 A1 | 3/2010 | Bull et al. | |
| 2010/0070575 A1 | 3/2010 | Bergquist et al. | |
| 2010/0225809 A1 | 9/2010 | Connors et al. | |
| 2010/0279822 A1 | 11/2010 | Ford | |
| 2010/0286979 A1 | 11/2010 | Zangvil et al. | |
| 2010/0287256 A1 | 11/2010 | Neilio | |
| 2010/0318357 A1* | 12/2010 | Istvan | H04N 5/4403 704/251 |
| 2011/0066438 A1 | 3/2011 | Lindahl et al. | |
| 2011/0067082 A1 | 3/2011 | Walker | |
| 2011/0087802 A1 | 4/2011 | Witriol et al. | |
| 2011/0119572 A1 | 5/2011 | Jang et al. | |
| 2011/0119590 A1* | 5/2011 | Seshadri | 715/728 |
| 2011/0153330 A1* | 6/2011 | Yazdani | G10L 13/00 704/260 |
| 2011/0177481 A1* | 7/2011 | Haff | G06F 17/30032 434/317 |
| 2011/0184738 A1* | 7/2011 | Kalisky et al. | 704/260 |
| 2011/0191105 A1 | 8/2011 | Spears | |
| 2011/0231474 A1* | 9/2011 | Locker | H04L 67/1095 709/203 |
| 2011/0246175 A1 | 10/2011 | Yi et al. | |
| 2011/0248959 A1 | 10/2011 | Diehl | |
| 2011/0261030 A1* | 10/2011 | Bullock | G06F 15/0283 345/204 |
| 2011/0288861 A1* | 11/2011 | Kurzweil | G09B 5/06 704/235 |
| 2011/0288862 A1 | 11/2011 | Todic | |
| 2011/0296287 A1 | 12/2011 | Shahraray et al. | |
| 2011/0320189 A1 | 12/2011 | Carus et al. | |
| 2012/0023447 A1* | 1/2012 | Hoshino et al. | 715/823 |
| 2012/0030288 A1 | 2/2012 | Burckart et al. | |
| 2012/0054813 A1 | 3/2012 | Carmichael | |
| 2012/0084455 A1* | 4/2012 | McCue | H04N 21/235 709/231 |
| 2012/0109640 A1 | 5/2012 | Anisimovich et al. | |
| 2012/0150935 A1 | 6/2012 | Frick et al. | |
| 2012/0158706 A1 | 6/2012 | Story, Jr. et al. | |
| 2012/0166180 A1 | 6/2012 | Au | |
| 2012/0191726 A1 | 7/2012 | Markus et al. | |
| 2012/0197998 A1 | 8/2012 | Kessel et al. | |
| 2012/0210203 A1* | 8/2012 | Kandekar | G06F 17/30719 715/230 |
| 2012/0236201 A1* | 9/2012 | Larsen | H04N 21/235 348/468 |
| 2012/0245719 A1 | 9/2012 | Story, Jr. et al. | |
| 2012/0245720 A1 | 9/2012 | Story, Jr. et al. | |
| 2012/0245721 A1 | 9/2012 | Story, Jr. et al. | |
| 2012/0246343 A1 | 9/2012 | Story, Jr. et al. | |
| 2012/0310642 A1* | 12/2012 | Cao et al. | 704/235 |
| 2012/0310649 A1* | 12/2012 | Cannistraro | G10L 13/00 704/260 |
| 2012/0315009 A1 | 12/2012 | Evans et al. | |
| 2012/0324324 A1 | 12/2012 | Hwang et al. | |
| 2013/0041747 A1 | 2/2013 | Anderson et al. | |
| 2013/0073449 A1 | 3/2013 | Voynow et al. | |
| 2013/0073675 A1 | 3/2013 | Hwang et al. | |
| 2013/0074133 A1 | 3/2013 | Hwang et al. | |
| 2013/0103814 A1 | 4/2013 | Carrasco et al. | |
| 2013/0130216 A1 | 5/2013 | Morton et al. | |
| 2013/0151954 A1* | 6/2013 | Ierullo | 715/254 |
| 2013/0212454 A1 | 8/2013 | Casey | |
| 2013/0257871 A1 | 10/2013 | Goldstein et al. | |
| 2013/0262127 A1 | 10/2013 | Goldstein et al. | |
| 2014/0005814 A1 | 1/2014 | Hwang et al. | |

(56) References Cited

U.S. PATENT DOCUMENTS

| | | |
|---|---|---|
| 2014/0039887 A1 | 1/2014 | Dzik et al. |
| 2014/0040713 A1 | 2/2014 | Dzik et al. |
| 2014/0195241 A1 | 7/2014 | Nguyen et al. |
| 2014/0223272 A1 | 8/2014 | Arora et al. |
| 2014/0250219 A1 | 9/2014 | Hwang |
| 2015/0026577 A1 | 1/2015 | Story et al. |
| 2015/0340038 A1 | 11/2015 | Dzik et al. |

FOREIGN PATENT DOCUMENTS

| | | |
|---|---|---|
| EP | 2689342 | 1/2014 |
| EP | 2689346 | 1/2014 |
| JP | 2002-140085 | 5/2002 |
| JP | 2002-328949 | 11/2002 |
| JP | 2003-304511 | 10/2003 |
| JP | 2004-029324 | 1/2004 |
| JP | 2004-117618 | 4/2004 |
| JP | 2004-266576 | 9/2004 |
| JP | 2005-189454 | 7/2005 |
| JP | 2007-522591 | 8/2007 |
| JP | 2007-249703 | 9/2007 |
| JP | 2010-250023 | 11/2010 |
| NZ | 532174 | 1/2007 |
| WO | WO 2006/029458 A1 | 3/2006 |
| WO | WO 2011/144617 | 11/2011 |
| WO | WO 2011/151500 | 12/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

International Search Report and Written Opinion in PCT/US2014/014508 mailed Jun. 25, 2014.
International Preliminary Report on Patentability issued in connection with International Patent Application No. PCT/US12/30198 mailed on Jan. 30, 2014, 8 pages.
"Speech Synthesis Markup Language," http://en.wikipedia.org/wiki/Speech_Synthesis, last modified Feb. 22, 2012, last accessed Mar. 5, 2012.
"Speech Synthesis Markup Language," http://en.wikipedia.org/wiki/Speech_Synthesis_Markup_Language, last modified Feb. 12, 2011, last accessed Mar. 5, 2012.
Arar, Yardena, Jan. 7, 2010, Blio E-Book Platform: No Reader (Yet), But Great Graphics.
Beattie, Valerie et al., "Reading Assistant: Technology for Guided Oral Reading", Scientific Learning, Apr. 10, 2012, 5 pages.
Dzik, et al., U.S. Appl. No. 13/604,482, filed Sep. 5, 2012, entitled "Identifying Corresponding Regions of Content."
Dzik, et al., U.S. Appl. No. 13/604,486, filed Sep. 5, 2012, entitled "Selecting Content Portions for Alignment."
Dzik, Steven Charles, U.S. Appl. No. 13/662,306, filed Oct. 26, 2012, entitled "Content Presentation Analysis."
Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.
Goldstein et al. , U.S. Appl. No. 13/535,260, filed Jun. 27, 2012, entitled "Conveying Questions With Content."
International Search Report issued for PCT/US12/30198 mailed on Jun. 20, 2012, 16 pages.
International Search Report re International Application No. PCT/US13/33935 mailed on Jul. 3, 2013.
Lester, Kevin S. , U.S. Appl. No. 13/526,343, filed Jun. 18, 2012, entitled "Multiple Voices in Audio Content."
Levinson, S.E. et al., "Continuous Speech Recognition from a Phonetic Transcription", Acoustics, Speech, and Signal Processing, Apr. 1990, pp. 190-199.
Munroe, Randall, "My Hobby: Embedding NP-Complete Problems in Restaurant Orders," Jul. 9, 2007, http://xkcd.com/287.
Roub, Paul, "I'll Buy an E-book Reader When . . . ", Nov. 16, 2007, available at: http://roub.net/blahg/2007/11/16/ill-buy-an-eboo/ (accessed Sep. 6, 2012), 2 pages.
Simonite, Tom, "Software Translates Your Voice into Another Language," Technology Review, Mar. 9, 2012, available at www.technologyreview.com/computing/39885/page1, last accessed Mar. 14, 2012.
Vignoli, Fabio et al., Aug. 7-10, 1999, A Text-Speech Synchronization Technique With Applications to Talking Heads, Auditory-Visual Speech Processing, ISCA Archive.
Weber, Frederick V., U.S. Appl. No. 13/531,376, filed Jun. 22, 2012, entitled "Modelling Expected Errors for Discriminative Training."
Zhong et al., "Energy Efficiency of Handheld Computer Interfaces: Limits, Characterization and Practice", MobiSys '05, Proceedings of the 3rd international conference on Mobile Systems, applications, and services, 2005, pp. 247-260.
Office Action in Japanese Application No. 2014-501254 dated Oct. 14, 2014.
International Preliminary Report on Patentability in PCT/US2013/042903 mailed Dec. 2, 2014.
International Search Report issued in connection with International Patent Application No. PCTUS12/30186 mailed on Jun. 20, 2012, 12 pages.
International Search Report and Written Opinion in PCT/US2013/042903 mailed Feb. 7, 2014.
International Search Report issued in connection with International Application No. PCT/US13/53020 mailed on Dec. 16, 2013.
Extended Search Report in European Application No. (12761404.8) dated Jan. 26, 2015.
International Preliminary Report issued in connection with International Application No. PCT/US13/53020 mailed on Feb. 12, 2015.
Extended Search Report in European Application No. 12761104.4 dated Apr. 20, 2015.
Office Action in Canadian Application No. 2830906 dated Mar. 17, 2015.
Hwang, D.C., et al., U.S. Appl. No. 13/536,711, filed Jun. 28, 2012, entitled Pacing Content.
Office Action in Japanese Application No. 2014-501254 dated May 11, 2015.
International Preliminary Search Report on Patentability in PCT/US2014/014508 mailed Aug. 4, 2015.
Office Action in Canadian Application No. 2830622 dated Jun. 10, 2015.

\* cited by examiner

SELECTING PRESENTATION POSITIONS IN DYNAMIC CONTENT

BACKGROUND

Generally described, computing devices may present items of digital content to users. For example, computing devices may visually present items of content such as animations, movies, television programs, videos, live events (e.g., sporting events), multi-media content and portions thereof on an electronic screen or touchscreen. Computing devices may also direct audible output through headphones or speakers to audibly present content included audiobooks, songs, movies, television programs, videos, sporting events, multi-media content and portions thereof.

An item of dynamic content (such as content that includes audio or video content that is continuously presented over time) may be navigated. In many approaches, this navigation is purely chronological. For instance, play, pause, fast-forward and rewind user interface elements may be provided to navigate the content with respect to its running time. Other user interface elements may also be provided to navigate to a particular time in the content.

One limitation of these approaches, among others, is that it is often difficult for a user to find a desired position in the content using chronological navigation. A further limitation of these approaches is that navigating content in this way may require significant amounts of user attention. Moreover, a user may have to know the structure of the content in advance to be able to make an informed decision as to where he or she wishes to navigate. These limitations, among others, are present in many different types of digital content.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
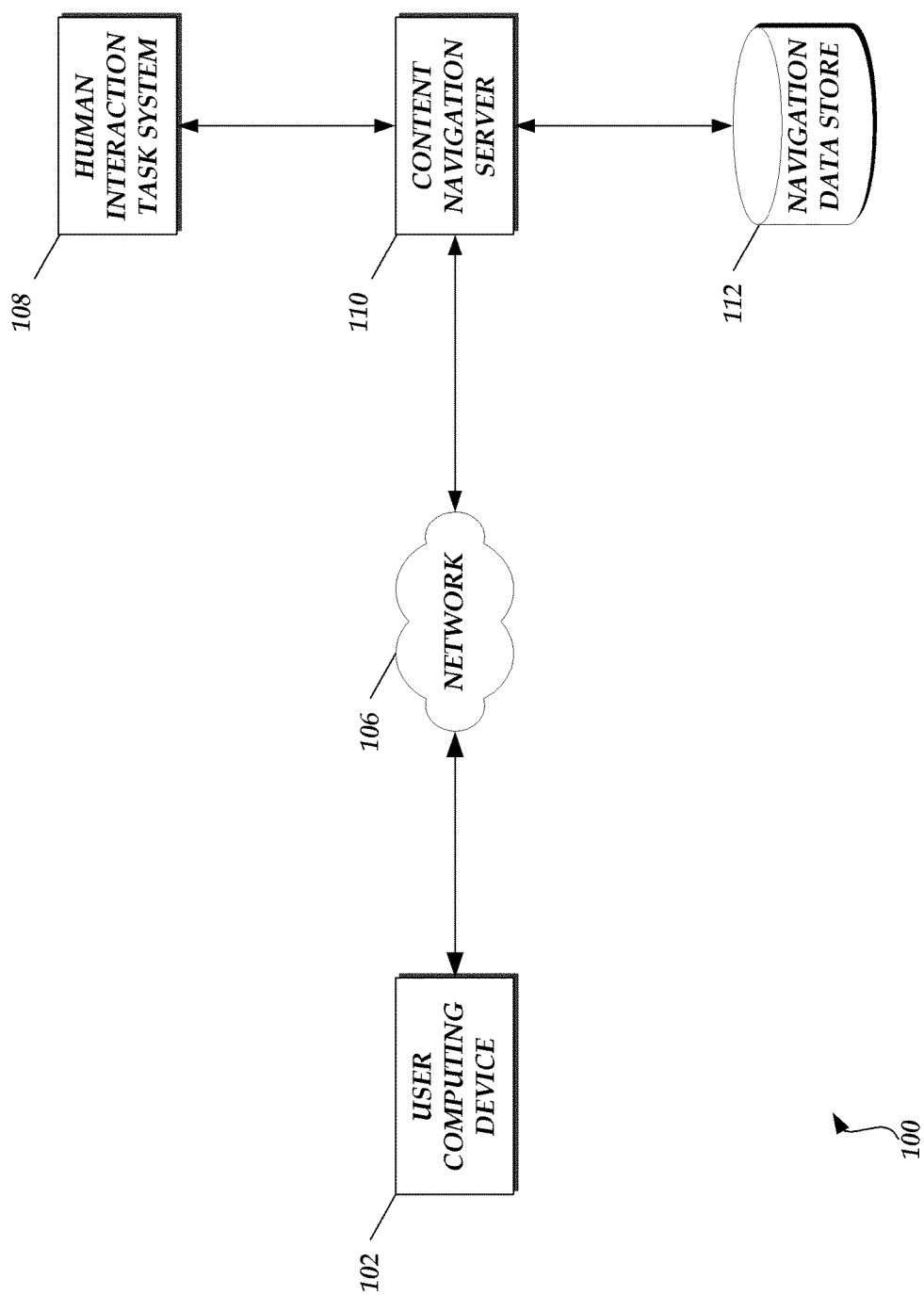
FIG. 1 is a schematic block diagram depicting an illustrative network environment in which a content navigation service is implemented.

Generally described, aspects of the present disclosure are directed to facilitating navigation of an item of dynamic content, which may generally refer to any item of content that includes audio and/or video content. Accordingly, a content navigation service is disclosed. In one embodiment, the content navigation service identifies one or more content elements in an item of dynamic content and determines presentation positions (e.g., chronological positions measured with respect to the overall running time of the dynamic content) of the content elements in the item of dynamic content. The content navigation service may further receive a navigation command (such as a voice command or search query) from a user of the item of dynamic content to navigate to a presentation position at which a selected content element is present. The item of dynamic content may then be presented starting from a presentation position at or near the presentation position at which the content element is present.

As used herein, a "content element" may generally refer to any structure or object present in an item of dynamic content to which a user may wish to navigate. In some embodiments, content elements include referents present in one or more portions of the content, such as characters, events, settings, moods and the like. In other embodiments, content elements include syntactic structures, such as words, phrases, sentences, or paragraphs. These syntactic structures may optionally be associated with a referent. For example, a sentence spoken as a line of dialogue may be associated with the character that spoke it, or a paragraph describing a setting may be associated with the setting that it describes. In further embodiments, content elements include structural subdivisions of the item of dynamic content, such as chapters, scenes, movements, acts, verses, etc.

As discussed above, the content navigation service may identify content elements and determine their presentation positions in an item of dynamic content. In some embodiments, the content navigation service identifies content elements in an item of textual content that is a companion to the item of dynamic content. As used herein, an item of dynamic content and an item of textual content may be "companions" if they relate to the same content title, such as an audiobook and an electronic book of the novel "The Adventures of Tom Sawyer." The item of dynamic content and the companion item of textual content may be synchronized, such that one or more words in the item of textual content are associated with a presentation position in the item of dynamic content (e.g., a time in the item of dynamic content during which the one or more words are audibly presented). Accordingly, a content element may be identified in the item of textual content and associated with a corresponding presentation position in the item of dynamic content based on the synchronization between the item of dynamic content and the item of textual content. More information pertaining to synchronizing companion items of textual and dynamic content may be found in U.S. patent application Ser. No. 13/604,482, entitled "IDENTIFYING CORRESPONDING REGIONS OF CONTENT" and filed on Sep. 5, 2012; and in U.S. patent application Ser. No. 13/604,486, entitled "SELECTING CONTENT PORTIONS FOR ALIGNMENT" and filed on Sep. 5, 2012. The disclosures of both of these applications are hereby incorporated by reference in their entireties. Further information pertaining to synchronizing companion items of textual and dynamic content may be found in U.S. patent application Ser. No. 13/070,313, filed on Mar. 23, 2011, entitled "SYNCHRONIZING DIGITAL CONTENT," and in U.S. patent application Ser. No. 12/273,473, filed Nov. 18, 2008, entitled "SYNCHRONIZATION OF DIGITAL CONTENT." The disclosures of both of these applications are hereby incorporated by reference in their entireties.

Content elements may be identified in an item of textual content in a number of ways. For example, to identify content elements corresponding to characters, settings, events, or moods; natural language techniques, regular expression techniques, content parsing techniques, semantic analysis techniques, syntactic analysis techniques, named entity extraction and other techniques may be used. In other embodiments, content elements are identified with metadata provided in the item of textual content. In still further embodiments, content elements may be identified with input from a human interaction task system, a computerized system wherein questions are routed to human volunteers whose answers are provided to the computerized system for further processing. Still other ways of identifying content elements corresponding to characters, settings, events, moods and the like are possible. More information on identifying such content elements may be found in U.S. patent application Ser. No. 13/434,538, entitled "CONTENT CUSTOMIZATION," filed on Mar. 29, 2012; U.S. patent application Ser. No. 13/465,853, entitled "CONTENT CUSTOMIZATION," filed on May 7, 2012; U.S. patent application Ser. No. 12/972,058, entitled "GRAPHICALLY REPRESENTING ASSOCIATIONS BETWEEN REFERENTS AND STORIES," filed on Dec. 17, 2010; and U.S. patent application Ser. No. 12/881,021, entitled "SYSTEMS AND METHODS FOR ASSOCIATING STORIES WITH RELATED REFERENTS." The disclosures of all four of these applications are hereby incorporated by reference in their entireties.

To identify content elements in the item of textual content that correspond to syntactic structures or structural subdivisions; optical character recognition, statistical language models (SLMs), finite grammars, or other techniques may be used. For example, optical character recognition techniques may be used to identify spaces between words, spaces between paragraphs and punctuation between sentences. Statistical language models may be used to identify the presentation position of phrases and sentences as well. Still other techniques for determining the presentation position of content elements that correspond to syntactic structures may be used.

Content elements may also be identified directly in the item of dynamic content. For example, structural subdivisions in an item of dynamic content may be identified with reference to one or more reference points in them item of dynamic content (e.g., the subdivision may be bounded by a reference point on either chronological "side"). The content navigation service may identify reference points using automated techniques, manual techniques, or a combination of the two. In one embodiment, the content navigation service identifies reference points by using labels or other markup that may be embedded in or included with the item of content. For example, the beginnings or ends of chapters may be labeled as reference points in an audiobook. Reference points may also be provided by the author or publisher of an item of content, or may be identified by a human worker of a human interaction task system. For example, a portion of the item of dynamic content may be presented to a human worker of a human interaction task system, along with the question, "Please identify any reference points in this portion of an item of dynamic content." The human worker may identify any reference points present, and the results may be routed to the content navigation service. Direct analysis of the item of dynamic content itself (e.g., by audio analysis and/or image processing) may also be used to identify structural subdivisions in the item of dynamic content. More information on identifying structural subdivisions in an item of dynamic content can be found in U.S. patent application Ser. No. 13/536,711, entitled "PACING CONTENT" and filed on Jun. 28, 2012. The disclosure of this application is hereby incorporated by reference in its entirety.

In various embodiments, the content navigation service enables a user to navigate the item of dynamic content by processing navigation commands received from the user. For example, the content navigation service may capture speech spoken by a user (e.g., into a microphone of a user computing device). Speech recognition techniques known in the art may be used to identify the words spoken by a user, which words may be processed to identify a content element and corresponding presentation position to which the user wishes to navigate. The content navigation service may also (or instead) provide a graphical user interface through which a user can provide input to navigate to a content element. It will be appreciated that commands may specify an absolute presentation position in the item of dynamic content (e.g., "Go to the first paragraph of '*The Adventures of Tom Sawyer*'"), or may specify a relative presentation position with respect to the current presentation position (e.g., "Go to the next time Aunt Polly appears.").

In some embodiments, the content navigation service provides a structured language in which navigation commands may be provided (e.g., "GO TO NEXT PARAGRAPH" or "GO BACK FIVE WORDS"). In other embodiments, the content navigation service may process an unstructured or natural language navigation command (e.g., "Go to the part where Tom tricks everyone into whitewashing the fence") using natural language processing techniques to identify a content element and associated presentation position to which the user wishes to navigate. Still other methods for identifying a desired content element and/or presentation position in a navigation command are possible.

To further facilitate the navigation of an item of dynamic content, content navigation information may be generated for an item of dynamic content. Generally described, content navigation information may include information pertaining to the presentation positions of content elements present in the item of dynamic content. This content navigation information may be provided by a content navigation server to a computing device that presents the item of dynamic content, such that the computing device presenting the item of dynamic content need not repeat the process of identifying content elements. Rather, when the computing device presenting the item of dynamic content receives a command, the computing device may consult the content navigation information to determine a presentation position of a content element specified in the command.

In one example application, the content navigation service synchronizes a companion electronic book and audiobook. The content navigation service may then receive a voice navigation command to navigate to a particular content element in the audiobook. The content navigation service may identify a presentation position of the content element in the electronic book and determine a corresponding position of the content element in the audiobook. The content navigation service may cause the audiobook to be presented at the corresponding position. Advantageously, a user of the content navigation service may navigate to the presentation position of the content element in the audiobook without knowing the presentation position of the content element in advance.

The content navigation service may be implemented in any of a number of environments in which content is presented. In one embodiment, the content navigation service is implemented as an application executed on a user computing device configured to present an item of dynamic content. A graphical user interface for navigating the item of dynamic content may be provided on the user computing device as the application is executed, or the application may enable the user computing device to receive and process voice commands for content navigation. In another embodiment, the content navigation service is implemented through a content page hosted by a content navigation server on a network. The content page may accessed by a user computing device provided with a network resource browser. A user interface for navigating the item may be provided on the content page for navigating the item of dynamic content, which may be streamed from the content navigation server to the user computing device for presentation thereon. Still other implementations are possible.

While reference is made herein to presenting audio content that is synchronized to textual content for illustrative purposes, it will be recognized that the content navigation service may be used with any item of dynamic content. The item of dynamic content to be navigated may include any type of content that is presented continuously over time. Non-limiting examples of dynamic content include audiobooks, musical works, television programs, video clips, movies, multimedia content, video games, broadcasts of dynamic events and other types of content. Likewise, the companion item of textual content may include any type of digital textual content, such as an electronic book, screenplay, script, libretto, transcription (e.g., speech-to-text), sheet music, text commentary, or other textual content.

Further, in some embodiments, companion items of dynamic content may also be synchronized, such that content elements present in one item of dynamic content may be used to navigate a second item of dynamic content. In an illustrative example, the content navigation service may synchronize a video of a ballet performance of Igor Stravinsky's "The Firebird" with an orchestral performance of the "Firebird Suite," which is the companion music for the ballet. The movements (structural subdivisions) of the "Firebird Suite" may be identified, and corresponding times for those movements identified in the video of "The Firebird" may be determined, such that the user may navigate the video of "The Firebird" by selecting a presentation position in "Firebird Suite." Still other implementations are possible.

Turning to FIG. 1, an illustrative network environment 100 is shown. The network environment 100 may include a user computing device 102, a network 106, a human interaction task system 108, a content navigation server 110 and a navigation data store 112. The constituents of the network environment 100 may be in communication with each other either locally or over the network 106.

The user computing device 102 may be any computing device capable of communicating over the network 106, such as a laptop or tablet computer, personal computer, personal digital assistant (PDA), hybrid PDA/mobile phone, mobile phone, global positioning system (GPS) device, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like.

The user computing device 102 may generally be capable of presenting content to a user. For example, the user computing device 102 may be capable of playing audio content by directing audible output through speakers, headphones, or the like. The user computing device 102 may also be capable of presenting images, video content, text and user interfaces on a display. The user computing device 102 may further be capable of receiving user input (e.g., commands to navigate an item of dynamic content) through a user input device, such as a keyboard, mouse, touchpad, trackball, touchscreen display, gamepad, or other input device known in the art. The user computing device 102 may further be capable of receiving voice commands by means of a microphone, audio receiver, etc.

The user computing device 102 may further be capable of accessing network resources, such as Web sites providing content pages, via the network 106. For example, the user computing device 102 may be provided with a network resource browser capable of displaying content pages provided by the content navigation server 110 via the network 106. Items of dynamic content may be presented through these content pages on the user computing device 102, e.g., by streaming an item of dynamic content from the content navigation server 110 over the network 106 to the user computing device 102. In some embodiments, the user computing device 102 also communicates over the network 106 to route natural language commands to navigate to a content element to the content navigation server 110. As natural language commands may require a relatively high amount of processing power to process, it may be advantageous to provide a natural language command received at the user computing device 102 to the content navigation server 110 for processing, the results of which processing (e.g., an identification of a presentation position of the content element in the item of dynamic content) may be returned to the user computing device 102.

In some embodiments, the user computing device 102 also stores one or more items of dynamic or textual content in a local or remote electronic data store (not shown). The user computing device 102 may further store content navigation information in the electronic data store. As discussed above, content navigation information may associate one or more content elements in an item of dynamic content with a presentation position (e.g., a chronological presentation position, a number of words presented, a number of syllables presented, or any other metric for measuring presentation position) in the item of dynamic content. For example, the user computing device 102 may include one or more hard disk drives, solid state memories and/or any other type of non-transitory computer-readable storage medium accessible to or integrated within the user computing device 102. These items may be retrieved from storage and presented by the user computing device 102.

The network 106 may be any wired network, wireless network, or combination thereof. In addition, the network 106 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

A human interaction task system 108 may be included in the network environment 100 to assist the content navigation server 110. Generally described, the human interaction task system 108 is a computerized system that electronically processes human interaction tasks (HITs). A HIT may be a difficult, time-consuming, or expensive task for a computing device to perform. However, it might be relatively easy and quick for a human to perform a HIT. Accordingly, the human interaction task system 108 might request a human worker to perform a HIT, e.g., for gathering information or answering a query, and to return the results or answers to the human interaction task system 108 for further processing and/or presentation to the requestor. Thus, in some embodiments, the content navigation service directs the human interaction task system 108 to pose one or more queries about an item of content to a human worker of the human interaction task system 108. For example, the human interaction task system 108 may ask a user to identify content elements in an item of dynamic content; identify content elements in an item of textual content so that a corresponding position of the content element in a companion item of dynamic content may be identified; and confirm identifications of content elements that may have been performed with machine techniques implemented by the content navigation server 110. The human worker of the human interaction task system 108 may respond to these and other tasks and communicate other information about the item of content to the content navigation server 110.

The content navigation server 110 is a computing device that may perform a variety of operations to implement the content navigation service. For example, the content navigation server may synchronize an item of dynamic content with an item of textual content; transcribe an item of dynamic content to generate a companion item of textual content; provide items of dynamic content and/or items of textual content to the user computing device 102; present an item of dynamic content and/or an item of textual content via a content page hosted on the network 106; stream items of dynamic content over the network 106 to the user computing device 102 for presentation thereon; process natural language commands received at the user computing device 102 and routed over the network 106; and perform other operations. Additional operations of the content navigation server 110 are described below with respect to FIG. 2.

The content navigation server 110 may be in communication with a navigation data store 112. The navigation data store 112 may electronically store items of dynamic and/or companion textual content, such as audiobooks, musical works, electronic books, television programs, video clips, movies, multimedia content, video games and other types of content. The navigation data store 112 may additionally store content navigation information. The navigation data store 112 may be embodied in hard disk drives, solid state memories and/or any other type of non-transitory computer-readable storage medium accessible to the content navigation server 110. The navigation data store 112 may also be distributed or partitioned across multiple local and/or remote storage devices as is known in the art without departing from the scope of the present disclosure. In yet other embodiments, the navigation data store 112 is a data storage web service.

The user computing device 102 and content navigation server 110 may each be embodied in a plurality of components, each executing an instance of the respective content user computing device 102 and content navigation server 110. A server or other computing system implementing the user computing device 102 and content navigation server 110 may include a network interface, memory, processing unit and non-transitory computer-readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and content navigation server 110. The memory generally includes RAM, ROM and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the content navigation server 110 may be represented in a single physical server or, alternatively, may be split into multiple physical servers.

The functionality of the content navigation service may be distributed among multiple computing devices in other ways as well. For example, a navigation command for navigating an item of content may be provided to a user computing device 102. The user computing device 102 may transmit the navigation command to a second computing device (such as a second user computing device 102) for processing. The second computing device may determine the presentation position specified by the navigation command. The second computing device may then cause presentation of the content from the presentation position. In a particular, non-limiting example, a set-top box may be in communication with a tablet device. A user may provide a navigation command to the tablet device (e.g., a voice command, touchscreen gesture, soft-key input, etc.). The tablet device may provide the navigation command to the set-top box, which may in turn determine the presentation position specified by the voice command. The set-top box may then cause presentation of the item of content from the presentation position specified by the voice command (e.g., by causing a television or other display in communication with the set-top box to present audible and/or visual content from the specified presentation position).

More generally, the various aspects of the content navigation service's functionality (e.g., receiving navigation commands, processing navigation commands, and/or presenting content) may be distributed as desired among one or more computing devices, including any number of user computing devices 102 and/or content navigation servers 110. The entire content navigation service may be implemented by a single user computing device 102 as well.

Additionally, in some embodiments, the content navigation service is implemented by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 2:
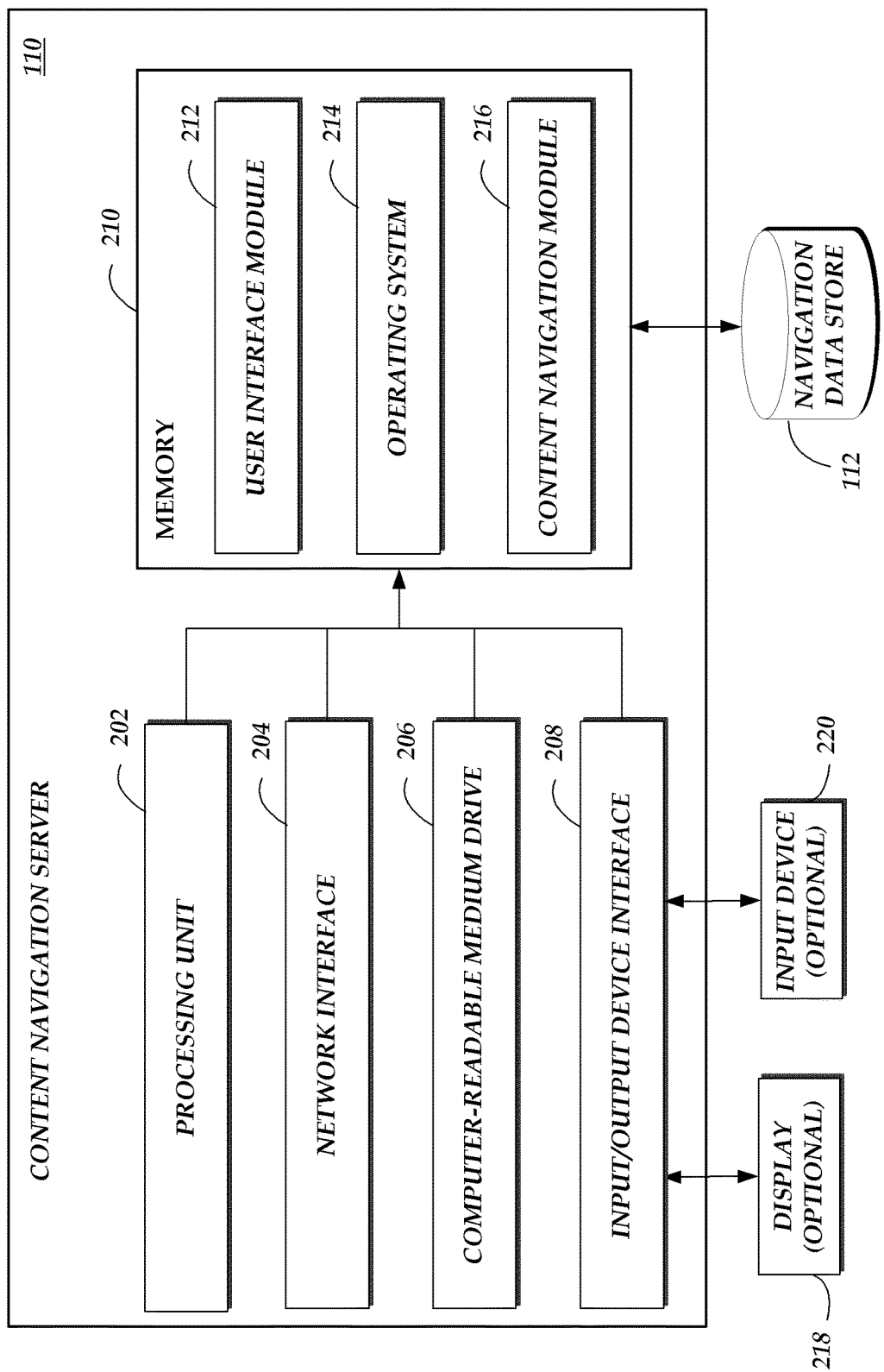
FIG. 2 is a schematic block diagram depicting an illustrative content navigation server of the network environment depicted in FIG. 1.

FIG. 2 is a schematic diagram of the content navigation server 110 shown in FIG. 1. The content navigation server 110 includes an arrangement of computer hardware and software components that may be used to implement the content navigation service. FIG. 2 depicts a general architecture of the content navigation server 110 illustrated in FIG. 1. Those skilled in the art will appreciate that the content navigation server 110 may include more (or fewer) components than those shown in FIG. 2. It is not necessary, however, that all of these generally conventional components be shown in order to provide an enabling disclosure.

The content navigation server 110 includes a processing unit 202, a network interface 204, a non-transitory computer-readable medium drive 206 and an input/output device interface 208, all of which may communicate with one another by way of a communication bus. As illustrated, the content navigation server 110 is optionally associated with, or in communication with, an optional display 218 and an optional input device 220. The display 218 and input device 220 may be used in embodiments in which users interact directly with the content navigation server 110, such as an integrated in-store kiosk or integrated component for inclusion in an automobile, boat, train, or airplane, for example. In other embodiments, the display 218 and input device 220 may be included in the user computing device 102 shown in FIG. 1. The network interface 204 may provide the content navigation server 110 with connectivity to one or more networks or computing systems. The processing unit 202 may thus receive information and instructions from other computing systems (such as the user computing device 102) or services via a network. The processing unit 202 may also communicate to and from memory 210 and further provide output information for an optional display 218 via the input/output device interface 208. The input/output device interface 208 may accept input from the optional input device 220, such as a keyboard, mouse, digital pen, touchscreen, microphone, audio receiver, or gestures recorded via motion capture. The input/output device interface 220 may also output audio data to speakers or headphones (not shown).

The memory 210 contains computer program instructions that the processing unit 202 executes in order to implement one or more embodiments of the content navigation service. The memory 210 generally includes RAM, ROM and/or other persistent or non-transitory computer-readable storage media. The memory 210 may store an operating system 214 that provides computer program instructions for use by the processing unit 202 in the general administration and operation of the content navigation server 110. The memory 210 may further include other information for implementing aspects of the content navigation service. For example, in one embodiment, the memory 210 includes a user interface module 212 that facilitates generation of user interfaces (such as by providing instructions therefor) for display upon a computing device such as the user computing device 102. For example, a user interface may be displayed via a navigation interface such as a network resource browser provided with the user computing device 102. In addition, the memory 210 may include or communicate with the navigation data store 112. Content stored in the navigation data store 112 may include various types of items of dynamic content and/or items of textual content as described above.

The content navigation module 216 may implement various operations of the content navigation service. For example, the content navigation module 216 may identify one or more content elements and their respective presentation positions in an item of dynamic content; synchronize an item of dynamic content and a companion item of textual content, such as an electronic book, script, transcription, or the like; present content via a content page hosted on the network 106; transcribe audio present in an item of dynamic content to generate a companion item of textual content; present a user interface for navigating an item of dynamic content; process voice commands or user interface commands to navigate to a content element; process natural language commands using natural language techniques known in the art; and perform other functions to implement the content navigation service.

In some embodiments, the content navigation service is implemented partially or entirely by the user computing device 102. Accordingly, the user computing device 102 may include a content navigation module 216 and other components that operate similarly to the components illustrated as part of the content navigation server 110, including a processing unit 202, network interface 204, non-transitory computer-readable medium drive 206, input/output interface 208, memory 210, user interface module 212, display 218, input device 220 and so forth.

Figure 3:
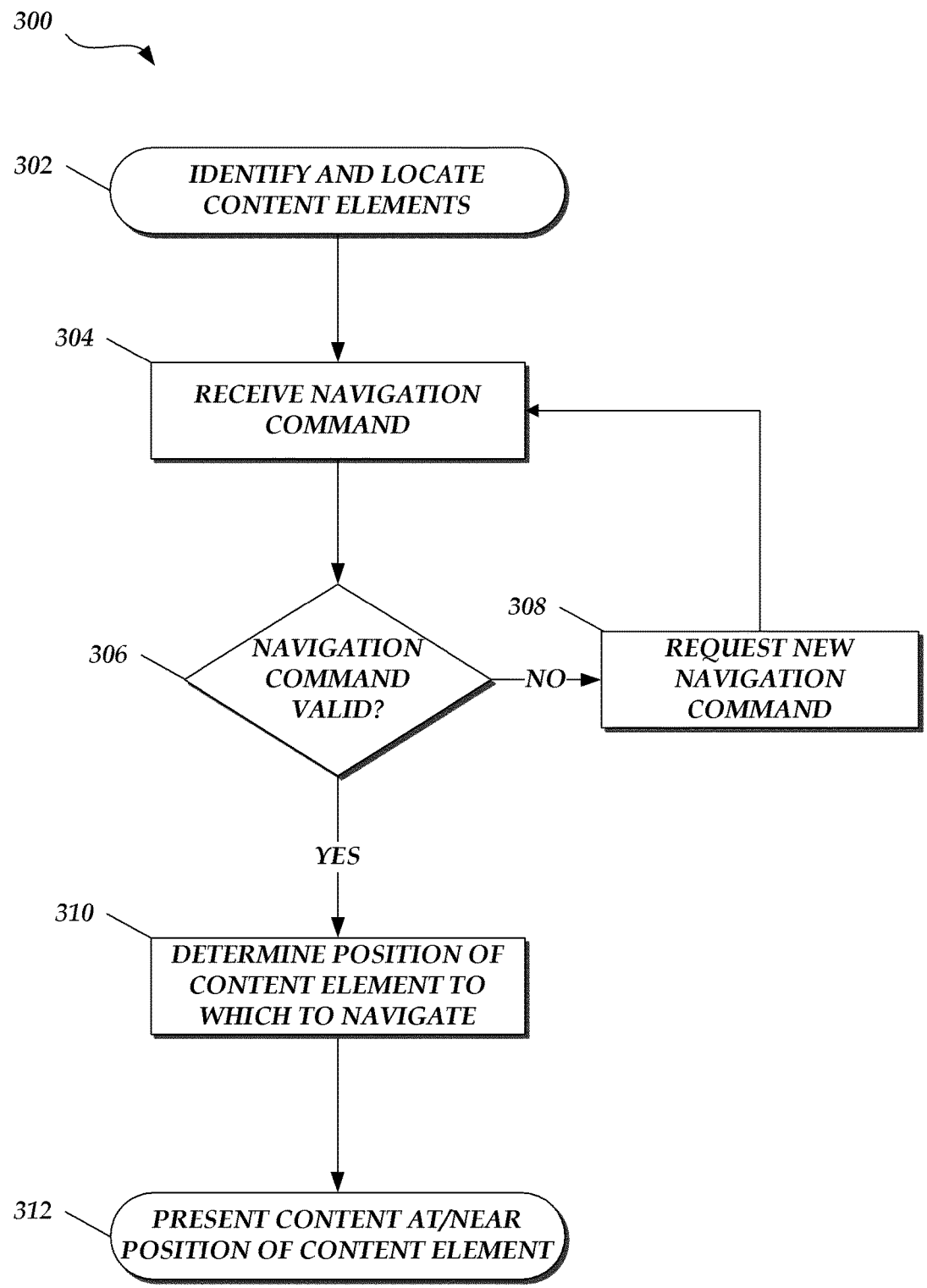
FIG. 3 is a flow diagram of an illustrative routine for navigating an item of dynamic content.

Turning to FIG. 3, an illustrative routine 300 for navigating an item of dynamic content is depicted. Generally described, this routine 300 may facilitate a user's navigation of an item of dynamic content by enabling the user to specify a selection of a content element in the item of dynamic content and presenting the item of dynamic content from a presentation position that is at or near the presentation position of the content element. This routine 300 may be implemented by, for example, execution of the content navigation module 216 provided with a content navigation server 110 or a user computing device 102.

The routine begins in block 302, wherein content elements present in the item of dynamic content may be identified and their associated presentation positions determined. As discussed above, content elements may include referents in the item of dynamic content, such as characters, events, settings, moods and the like; syntactic structures in the item of dynamic content, such as words, sentences, paragraphs and the like; or subdivisions in the item of dynamic content, such as movements, chapters, acts, scenes, verses and the like.

As discussed above, content elements may be identified in an item of dynamic content in many different ways, and their associated presentation positions may be determined in many different ways as well. In some embodiments, an author, creator, or publisher of the item of dynamic content may provide content navigation information indicating the presentation position of one or more content elements present in the item of dynamic content. For example, the content navigation service may provide user interfaces whereby an author, creator, or publisher of the item of dynamic content is enabled to "mark up" the item of dynamic content to indicate the presentation position of one or more content elements in the item of dynamic content. The content navigation service may also be operative to generate content navigation information via automated or machine techniques used to identify content elements and their presentation positions, as described below. In other embodiments, input from the human interaction task system 108 may be used to identify the presentation position of one or more content elements in an item of dynamic content. For example, a human worker of the human interaction task system 108 may be asked to identify which characters are present during a portion of an audiobook, or may be asked to identify when one play of a sporting event ends and when another play begins. The human worker's responses may be routed from the human interaction task system 108 to the content navigation server 110 (or other computing device implementing the content navigation service).

In some embodiments, content elements are identified in an item of dynamic content by analyzing an item of textual content that is a companion to the item of dynamic content. For example, the presentation position of content elements in an audiobook of "*The Adventures of Tom Sawyer*" may be identified based on the position of the content elements in an electronic book of "*The Adventures of Tom Sawyer*." One or more words presented as audio (e.g., spoken, sung, recited, narrated, etc.) in the item of dynamic content may be associated with one or more identical words present in the companion item of textual content. Timestamps may be assigned to the words in the item of dynamic content based on a transcription of audio content generated therefrom, and corresponding timestamps may be assigned to matching words in the companion item of textual content. Accordingly, content elements corresponding to words or groups of words may be identified in the item of textual content. A corresponding presentation position of the content element (e.g., one or more words corresponding to the content element) in the item of dynamic content may be identified based on the synchronization of the item of textual content and the item of dynamic content.

The content navigation service may incorporate input from a human interaction task system 108 to identify content elements in an item of textual content, and to determine the presentation positions of the identified content elements. For example, the human interaction task system 108 may present a portion of the item of textual content to a human worker of the human interaction task system 108, and ask the human worker to identify one or more content elements therein. In still another embodiment, the content navigation service may rely on a list of content elements known to be present in the item of textual content at particular positions. This list may be generated by, for example, one or more experts associated with the content navigation service or by user input. The list may be obtained from a network content library, network-based knowledge base, or network-based encyclopedia, among other examples. The positions of the content elements in the item of textual content may thus be associated with presentation positions in the item of dynamic content based on the synchronization between the item of dynamic content and the item of textual content.

It will be appreciated that the content navigation service may identify and content elements and their associated presentation positions by using any of a variety of automated or machine techniques in addition to or instead of the techniques described above. The particular technique chosen may vary based on the type of content element to be identified. A number of example techniques for identifying specific types of content elements are described herein, though it will be recognized that many different methods of identifying content elements in an item of dynamic content and determining their presentation positions in the item of dynamic content may be employed to implement the content navigation service. These example techniques are described in greater detail with reference to FIG. 4A, FIG. 4B, FIG. 4C and FIG. 4D.

Turning to block 304, the content navigation service may receive a navigation command, which may include a selection of a content element to which the user wishes to navigate. This navigation command may be received as a voice command spoken by the user and captured by an audio input device of the user computing device 102, or may be received as a search string input via a graphical user interface presented on the user computing device 102. Still other ways to receive a selection of a content element to which the user wishes to navigate are possible (e.g., touchscreen gestures, remote control, etc.)

The structure of the navigation command may vary. In some embodiments, the content navigation service provides a structured language in which navigation commands may be specified. The content navigation service may provide operators in the structured language and names for content elements, so the user can navigate to content elements with respect to the presentation position of the content element or with respect to a current presentation position of the item of dynamic content. Example navigation commands in a structured language might include "Skip next paragraph" or "Go to Tom Sawyer." Other operators and names for content elements are possible.

In other embodiments, the content navigation service can receive natural language or unstructured commands and process them using natural language techniques known in the art. A list of names and synonyms for commands and for content elements may be maintained by the content navigation service to process natural language commands. For example, a user listening to an audiobook of "*The Adventures of Tom Sawyer*" may provide a command such as "Go to the part where Tom tricked everyone into whitewashing the fence." It will be recognized that the distributed architecture present in some embodiments of the content navigation service may facilitate the processing of natural language commands. For example, a natural language command received at the user computing device 102 may optionally be routed over the network 106 to the content navigation server 110, which may have relatively more processing power than the user computing device 102. The results of the processed command, which may include an indication of a presentation position to which the user computing device 102 is to navigate, may be transmitted from the content navigation server 110 over the network 106 back to the user computing device 102. The user computing device 102 may then present the item of dynamic content from the presentation position indicated by the content navigation server 110. It will be recognized, however, that a user computing device 102 may also be configured to process natural language commands.

Structured and unstructured navigation commands may also be used to specify standing rules for the presentation of the item of dynamic content. For example, a navigation command may specify content elements whose presentation positions should be skipped over or ignored in the item of dynamic content. For example, for an audiobook, a user may specify in a navigation command that he or she only wishes to hear the dialogue. The user may accordingly provide a navigation command such as, "skip the narration," or "only play dialogue." Accordingly, the content navigation service may identify presentation positions that corresponding to background narration and skip over those presentation positions while presenting the item of dynamic content. Other standing rules may be specified for the presentation of items of dynamic contents.

In still further embodiments, the content navigation service can present a user with one or more presentation positions corresponding to one or more content elements. For example, the content navigation service may receive a selection of a content element, and, in response to receiving the selection, present a list of presentation positions at which the content element is present in the item of dynamic content. In another example, the content navigation service may present a user interface that includes a map, list, table, graph, directory, or other user interface element that provides information regarding one or more content elements and their associated presentation positions. The user may select a content element at a presentation position by interacting with the user interface. Still other ways to receive commands to navigate to a presentation position of a content element are possible.

In block 306, the content navigation service may determine whether the user's navigation command is valid, e.g., whether the user's selection of the content element is a valid selection. In some embodiments, navigation command is valid if it includes a selection of a content element that is present at any presentation position in the item of content. For example, the user may be listening to an audiobook of the play "Hamlet." If the user selects a content element corresponding to a character such as "Hamlet," a setting such as "Denmark," or a mood such as "darkly comic," these selections may be deemed valid as the title character appears in "*Hamlet*," the play is set in Denmark and "*Hamlet*" includes a darkly comic scene (namely, the "Alas, poor Yorick" portion). On the other hand, if the user provides a navigation command for the character "Macbeth" in the audiobook of the Shakespeare play "*Hamlet*," the navigation command may be considered invalid, as the character Macbeth does not appear in the play "*Hamlet*." In other embodiments, a navigation command is valid if the content element has at least one presentation position in a direction in which the user wishes to navigate in the content.

An example will be illustrative. In the play "*Hamlet*," the character Ophelia dies and is not mentioned after the scene of her funeral. A user listening to an audiobook of "*Hamlet*" may provide a command such as, "Go to the next time Ophelia is mentioned." If the current presentation position of the audiobook is after Ophelia's funeral, the navigation command may be deemed invalid, as Ophelia is not mentioned in "*Hamlet*" after her funeral, nor does she appear in the play after her death. If the current presentation position is before Ophelia's funeral, however, the navigation command may be deemed valid, as the current presentation position is before the last time Ophelia is mentioned in the audiobook of "*Hamlet*."

It will be recognized that some navigation commands may resolve to multiple presentation positions. For example, the character *Hamlet* appears throughout the play "*Hamlet*," and so would be present at multiple presentation positions in an audiobook of the play "*Hamlet*". These navigation commands may be deemed ambiguous. In some embodiments, a navigation command is deemed invalid if it there is no single presentation position for the content element specified therein, but rather there are multiple presentation positions at which the content element is present. However, the content navigation service may instead resolve this ambiguity by navigating to the first presentation position at which the content element is present, or by navigating to the first presentation position at which the content element is present that also lies after the current presentation position in the item of dynamic content. The content navigation service may also allow a user to resolve the ambiguity by enabling the user to select among the multiple presentation positions at which the content element is present. Still other methods for resolving ambiguities in navigation commands are possible.

A navigation command may also be deemed invalid if the content navigation service cannot process the command. For example, a user may speak a navigation command as a voice command, but the voice command may be unintelligible to the content navigation service (e.g., because the user spoke too softly, because there is too much background noise, etc.). In embodiments in which the content navigation service accepts only structured commands, the content navigation service may deem a navigation command invalid if it fails to adhere to the structural language provided by the content navigation service. In embodiments in which the content navigation service accepts natural language commands, the content navigation service may deem a navigation command invalid if it cannot be parsed using natural language processing techniques. Still other criteria for determining the validity of a command are possible.

If the navigation command is deemed invalid in block 306, the content navigation service may request a new navigation command in block 308. For example, the content navigation service may cause a user computing device 102 implementing the content navigation service to audibly or visibly present an error message, such as "Sorry, I didn't understand your command." The content navigation service may then receive a new navigation command in block 304.

If the navigation command received is deemed valid in block 306, the content navigation service may determine a presentation position of the content element to which the user wishes to navigate in block 310. As discussed above, the navigation command received in block 304 may include a selection of a content element as well as a selection of a presentation position associated with the content element. The presentation position of the content element to which the user wishes to navigate may be measured with relation to the current presentation position (e.g., "Go to the next time *Hamlet* is mentioned," or "Go back ten words") or may be measured with respect to the item of dynamic content as a whole (e.g., "Go to the first paragraph," or "Go to the third chapter").

Finally, in block 312, the content navigation service may cause the item of dynamic content to be presented at or near the presentation position of the content element specified by the navigation command. In some embodiments, the item of dynamic content is presented substantially at the presentation position at which the content element is present. In other embodiments, the item of dynamic content is presented from a presentation position at the beginning of a structural subdivision or syntactic structure of the item of dynamic content at which the content element is present. Navigating to the beginning of the structural subdivision (which may correspond to an act, scene, etc.) or syntactic structure (which may corresponding to a sentence, paragraph, etc.) at which the content element is present may provide a more seamless experience for a user navigating the item of dynamic content. An example will be illustrative. A user listening to an audiobook of the play "*Hamlet*" may wish to navigate to a presentation position in the item of dynamic content at which content elements corresponding to the characters Rosencrantz and Guildenstern are present. However, the presentation position at which these content elements are present may fall in the middle of a sentence, in the middle of a scene, etc. Accordingly, the content navigation service may present the item of dynamic content starting from the beginning of the sentence, beginning of the scene, etc. at which the content elements corresponding to the characters Rosencrantz and Guildenstern are present.

In addition to causing the item of dynamic content to be presented at or near the presentation position of the content element specified by the navigation command, the content navigation service may optionally cause presentation of a summary of the item of dynamic content that lies prior to the presentation position to which the user navigated with the navigation command. This summary can be provided as metadata associated with a content element (e.g., a structural subdivision) that lies prior to the presentation position to which the user navigated via the navigation command. Multiple summaries associated with multiple content elements that lie prior to the presentation position to which the user navigated via the navigation command may be provided. For example, if a user navigates to a structural subdivision corresponding to Chapter 3 of an audiobook, a summary of Chapters 1 and 2 of the audiobook may be presented prior to the presentation of Chapter 3.

As discussed above, the content navigation service may enable a user to navigate an item of dynamic content based on content elements in the item of dynamic content. These presentation positions may represent a time at which the content element is presented in the item of dynamic content. FIG. 4A, FIG. 4B, FIG. 4C and FIG. 4D are structure diagrams that graphically represent the presentation positions of illustrative types of content elements present in an example item of dynamic content. So as not to obscure the principles of the present disclosure, overlapping content elements have not been depicted. However, it will be recognized that multiple content elements may occupy substantially the same or overlapping presentation positions in an item of dynamic content.

Figure 4A:
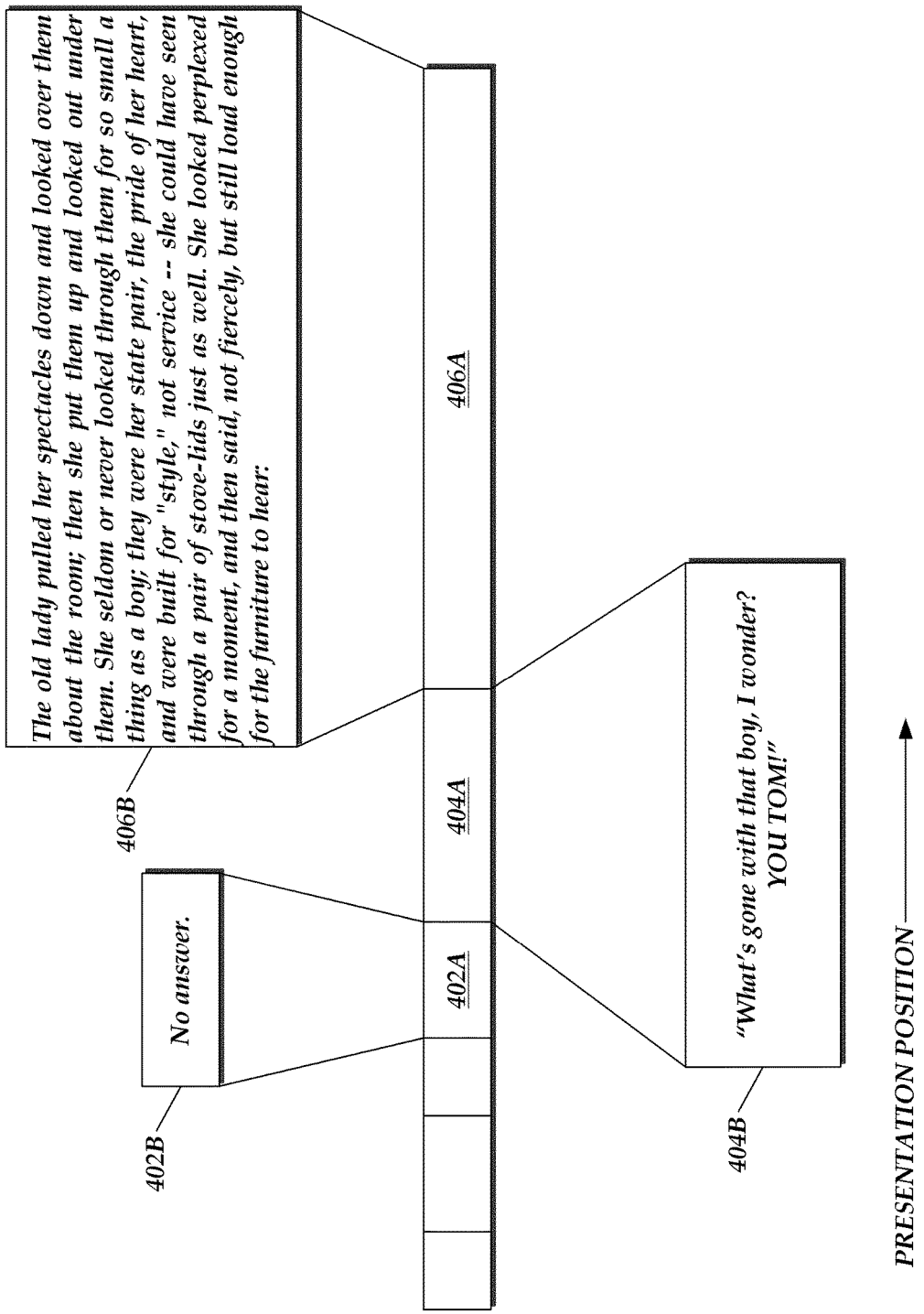
FIG. 4A, FIG. 4B, FIG. 4C and FIG. 4D are structure diagrams of illustrative items of dynamic content that include example content elements.

Turning specifically to FIG. 4A, several content elements corresponding to syntactic structures and their respective presentation positions are shown for an audiobook of "*The Adventures of Tom Sawyer*." Syntactic structures may correspond to words, phrases, sentences, paragraphs, lines of dialogue, poetry lines, quotations, etc. that are present in an item of textual content to which the item of dynamic content is synchronized. Positions of these syntactic structures may be identified in an item of textual content that is a companion to the item of dynamic content. Accordingly, the presentation position of a syntactic structure in the item of dynamic content may be determined based on the corresponding syntactic structure in the companion item of textual content, which may be an electronic book, script, screenplay, libretto, transcription, etc.

Syntactic structures in an item of textual content may be identified in a number of ways. Words, phrases, or sentences, may be identified using techniques such as statistical language models, finite grammars, optical character recognition to identify spaces, and other techniques. In examples pertaining to the English language and many other languages, a word may be bounded by spaces on either side; a phrase may be bounded by punctuation, prepositions, conjunctions, or changes in word type (e.g., noun to verb indicating a change from subject to predicate); and sentences or sentence fragments may be bounded at the beginning by a capital letter and at the end by a period, exclamation point, question mark, or the like.

Syntactic structures corresponding to paragraphs in an item of textual content may likewise be identified in several ways. In one embodiment, optical character recognition techniques are used to identify paragraph boundaries. For example, in many languages, words within the same paragraph typically proceed horizontally from left-to-right and down the page at the end of each line until the last word in the paragraph is reached. Once the last word in the paragraph has been reached, the first word of the next paragraph may appear on the next line, rather than in the same line as the last word in the previous paragraph. Accordingly, paragraph boundaries may be identified based on breaks in the typical horizontal progression of words in a paragraph. In other embodiments, metadata (such as embedded markup language) or characters indicating paragraph boundaries (such as pilcrows, carriage returns, ASCII or Unicode hard returns, paragraph numbers and the like) are used to identify paragraph boundaries.

It will be appreciated that the techniques for identifying syntactic structures discussed herein may be flexibly adapted for use with other languages based on how text progresses in a particular language. In one example for identifying sentences in Spanish-language text, the beginning of a sentence corresponding to a question may begin with an inverted question mark and end with an upright question mark. The upright and inverted question marks may thus bound a syntactic structure corresponding to a sentence. Additionally, in many East Asian languages (e.g., Chinese, Japanese and Korean) text may be read right-to-left and/or top-to-bottom, while in the Arabic and Hebrew languages, text may be read right-to-left and down the page at the end of each line, and thus the spacing techniques for identifying paragraphs discussed above may be adapted accordingly. Additionally, input from a human interaction task system 108 may be obtained to identify syntactic structures corresponding to words, phrases, sentences, paragraphs, lines of dialogue, poetry lines, quotations, etc.

As applied to an electronic book of "*The Adventures of Tom Sawyer*," the content navigation service may identify a presentation position 402A at which the sentence fragment 402B is presented in the audiobook of "*The Adventures of Tom Sawyer*." The identified presentation position 402A in the audiobook may be based on the timestamps assigned to the syntactic structure 402B in the item of textual content, based on the synchronization between the audiobook and the electronic book. Likewise, the content navigation service may assign a presentation position 404A to the quotation 404B, and a presentation position 406A may be assigned to paragraph 406B based on the synchronization of the words of the textual content to words presented in the item of dynamic content. More information regarding the synchronization of syntactic structures in an item of dynamic content that includes audio with syntactic structures in a companion item of textual content may be found in U.S. patent application Ser. No. 13/604,482, entitled "IDENTIFYING CORRESPONDING REGIONS OF CONTENT" and filed on Sep. 5, 2012; and in U.S. patent application Ser. No. 13/604,486, entitled "SELECTING CONTENT PORTIONS FOR ALIGNMENT" and filed on Sep. 5, 2012. The disclosures of both of these applications were previously incorporated by reference above in their entireties.

Figure 4B:
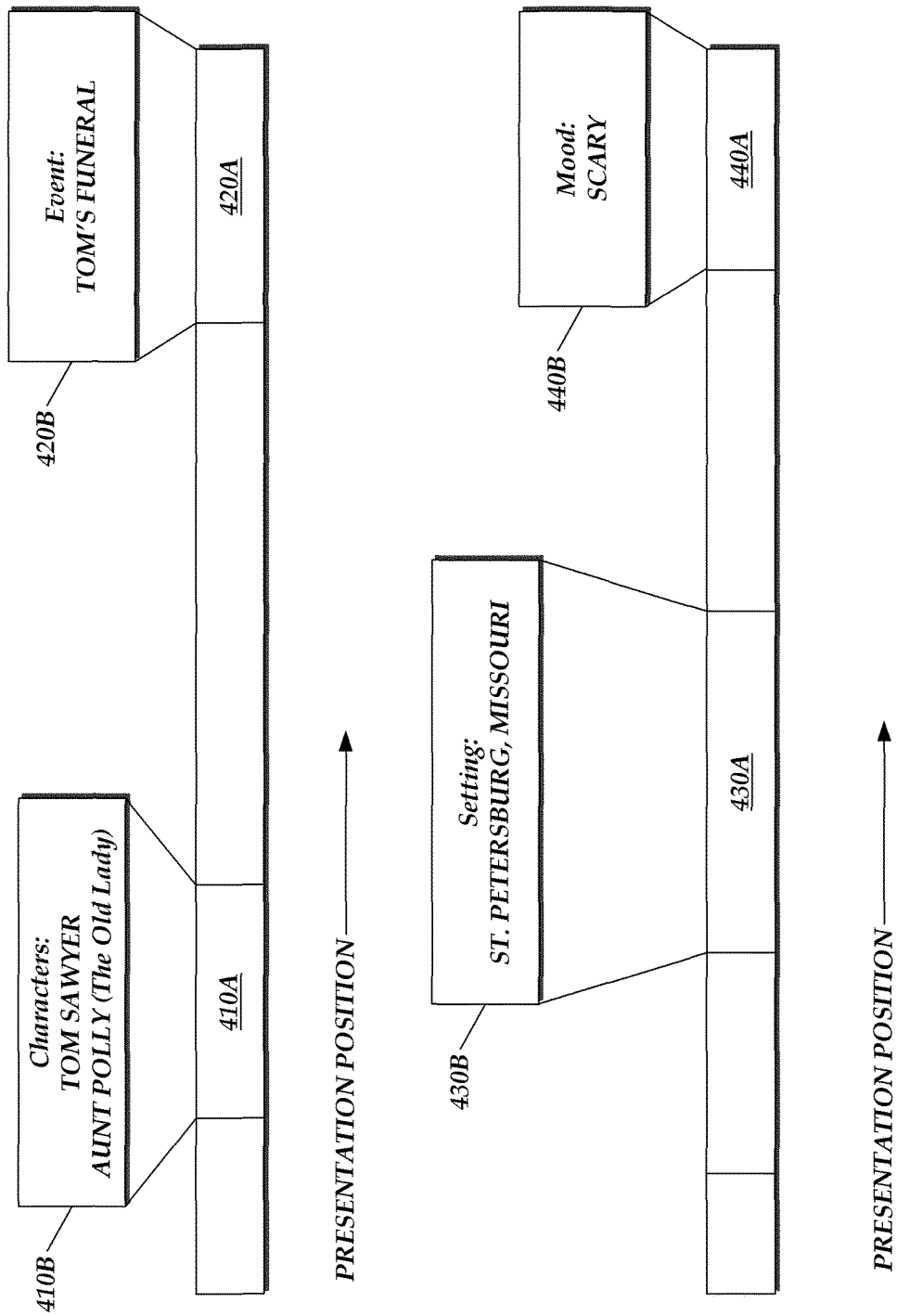

Turning specifically to FIG. 4B, content elements corresponding to referents are shown. Generally described, referents may include characters, settings, places, things, attributes, relationships, events and the like. The presentation positions of the referents in the item of companion textual content may be associated with a presentation position in the item of dynamic content based on the synchronization described above. Positions of these referents may be identified in an item of textual content that is a companion to the item of dynamic content. Accordingly, the presentation position of a referent in the item of dynamic content may be determined based on the corresponding referent in the companion item of textual content, which may be an electronic book, script, screenplay, libretto, transcription, etc.

The content navigation service may identify a presentation position 410A of a content element corresponding to one or more characters 410B. The presentation position of the characters (as may be determined by the presence of the characters' name, nicknames, epithets, or alternate spellings for the characters) may be identified in a companion item of textual content using techniques such as content scraping, natural language processing, or named entity extraction, among other techniques. Metadata may also be provided with the companion item of textual content indicating the presentation positions of these character content elements. Corresponding presentation positions in the item of dynamic content may be determined based on the synchronization between the item of dynamic content and the item of textual content. In a similar manner, the content navigation service may also identify a presentation position 420A of an event 420B in the item of dynamic content. The content navigation service may further identify a presentation position 430A of a setting 430B in the item of dynamic content.

The content navigation service may also identify a presentation position 440A of a mood element 440B. Content elements corresponding to moods in an item of dynamic content may be identified via contextual analysis of an item of textual content that is a companion to the item of dynamic content. As discussed above, an item of dynamic content and a companion item of textual content may be synchronized. Words such as "dark," "spooky" or "terrifying" in the item of textual content might prompt the content navigation service to assign a "scary" mood content element to a presentation position in the item of textual content. A presentation position 440A in the item of dynamic content that corresponds to the presentation position in the item of textual content to which the scary mood was assigned may be identified based on the synchronization. Accordingly, the scary mood content element 440B may be assigned to the presentation position 440A in the item of dynamic content. Mood content elements may also be identified in items of dynamic content that include music. For example, harmonic analysis on the music may reveal that music at a particular presentation position is in a minor key. Accordingly, a "sad" mood content element may be identified at the presentation position at which the music in a minor key is presented. Still other methods for identifying moods in an item of dynamic content are possible.

Additional methods for identifying referents and their presentation positions in an item of textual content or an item of dynamic content may be found in U.S. patent application Ser. No. 12/972,058, entitled "GRAPHICALLY REPRESENTING ASSOCIATIONS BETWEEN REFERENTS AND STORIES," filed on Dec. 17, 2010; and in U.S. patent application Ser. No. 12/881,021, entitled "SYSTEMS AND METHODS FOR ASSOCIATING STORIES WITH RELATED REFERENTS," filed on Sep. 13, 2010. The disclosures of both of these applications were previously incorporated by reference above in their entireties.

Figure 4C:
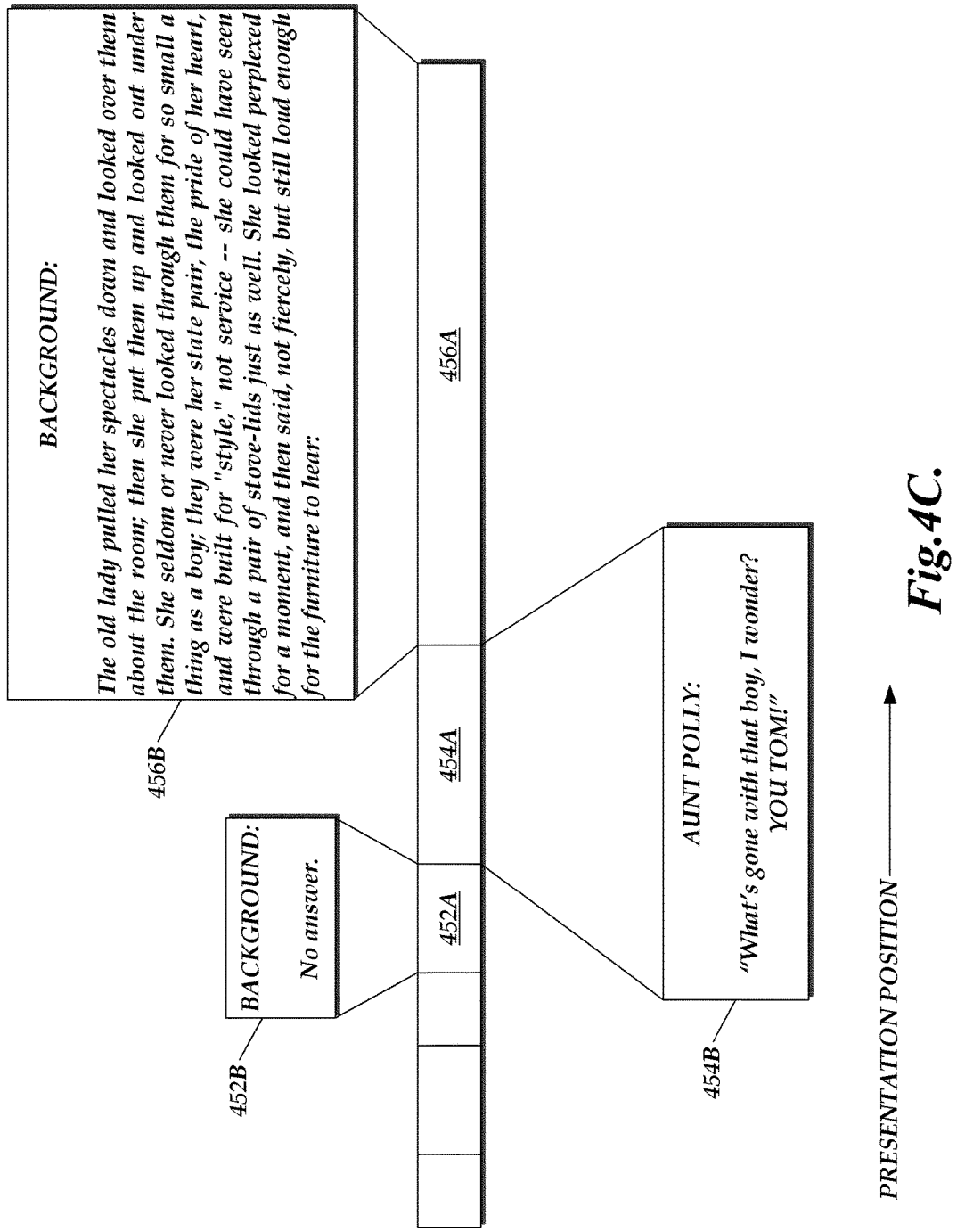

Turning specifically to FIG. 4C, content elements that correspond to both referents and syntactic structures are shown. As discussed above with respect to FIG. 4A, content elements corresponding to syntactic structures such as words, phrases, sentences, paragraphs, lines of dialogue, poetry lines, quotations, etc. may be identified in a companion item of textual content and may have presentation positions associated therewith in the item of dynamic content. These syntactic structures may further be associated with a referent. Positions of these syntactic structures may be identified in an item of textual content that is a companion to the item of dynamic content. Based on the synchronization between the companion item of textual content and the item of dynamic content, presentation positions for the syntactic structures in the item of dynamic content may be determined.

In one particular application, lines of dialogue (syntactic structures) in the companion item of textual content may be associated with a character (referent). These associations may be determined by analyzing the text of the item of textual content. For example, certain words, phrases, punctuation, spacing and other features of the text can be used to determine whether the portion of textual content should be assigned to a character (e.g., for a line of dialogue) or to the "background" of the item of content (e.g., for first-person or third-person narration, forewords, prefaces, front matter, back matter, stage directions, etc.).

Several different techniques may be used to identify where dialogue is present in an item of textual content and to identify a character with whom the dialogue is associated. For example, stack-based techniques or heat maps may be used to identify a presentation position at which a character is likely to be present in the item of textual content, and stochastic prediction techniques (such as Markov prediction models to predict transitions between characters in a conversation) or other predictive models can be used to associate syntactic structures (e.g., lines of dialogue) in an item of textual content to a particular speaker or to the background. More information on associating syntactic structures with characters or with background narration may be found in U.S. patent application Ser. No. 13/526,343, entitled "MULTIPLE VOICES IN AUDIO CONTENT" and filed on Jun. 18, 2012. The disclosure of this application is hereby incorporated by reference in its entirety.

Returning to the synchronized electronic book and audiobook of "The Adventures of Tom Sawyer," the sentence fragment 452B at presentation position 452A is associated with the background narration, as is the paragraph 456B at presentation position 456A. The line of dialogue 454B at presentation position 454A, by contrast, is associated with the character (referent) Aunt Polly. It will be recognized, of course, that other types of syntactic structures may be associated with other types of referents as well. Associating syntactic structures with particular referents advantageously enables the user to navigate to specific lines of dialogue spoken by a character, jump to a paragraph about a setting or event that is of particular interest to the user, skip over background narration that is not associated with a character, etc. Still other advantages for content navigation are afforded by associating syntactic structures with referents in this way.

Figure 4D:
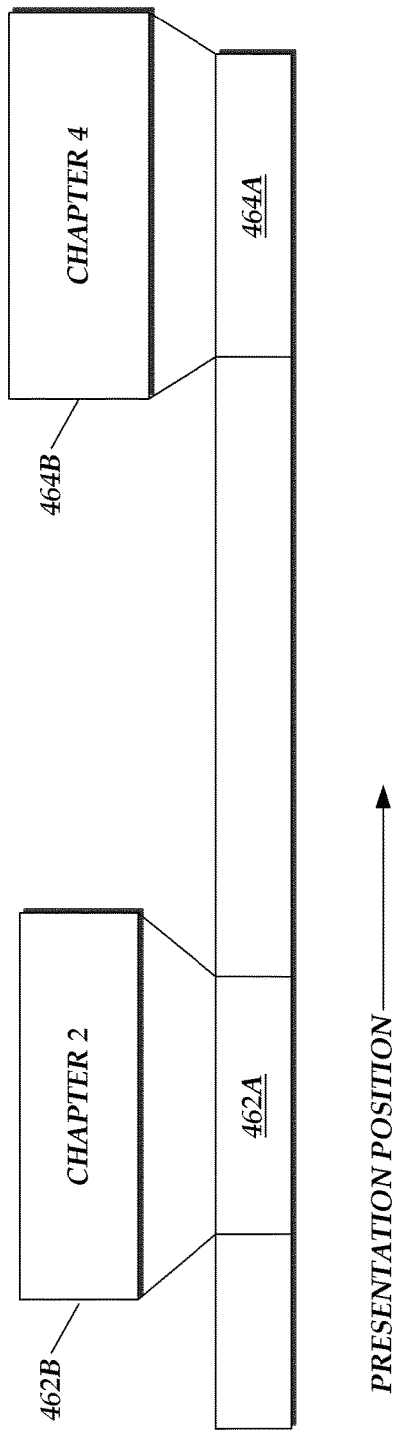
Figure 4D:
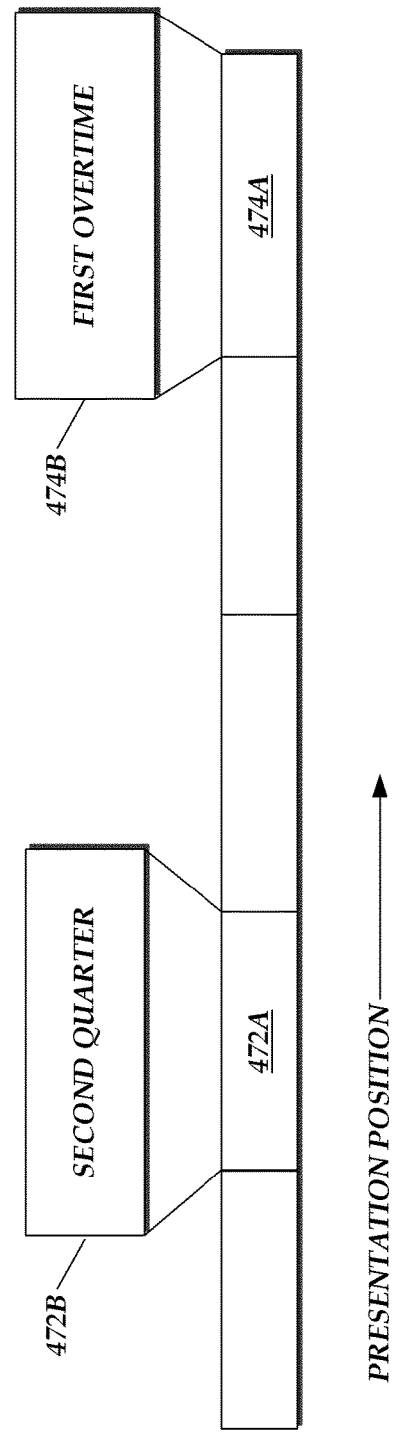

Turning specifically to FIG. 4D, content elements corresponding to content subdivisions are shown. Content subdivisions may generally refer to structural portions of an item of dynamic content. For example, subdivisions may include chapters, scenes, movements, acts, verses, etc. These subdivisions may be bounded by reference points. Several example methods for identifying reference points (and thus subdivisions) of items of dynamic content are discussed herein. Further information regarding identifying reference points in an item of dynamic content may be found in U.S. patent application Ser. No. 13/536,711, entitled "PACING CONTENT" and filed on Jun. 28, 2012. The disclosure of this application was previously incorporated by reference in its entirety above.

In some embodiments, the content navigation service analyzes audio in the item of dynamic content to identify reference points that provide boundaries for a content subdivision. For example, the content navigation service may analyze the volume of the audio in the dynamic content over time. A presentation position in item of dynamic content at which the volume of the audio is substantially equal to zero (e.g., there is no audio or silent audio), which may represent a break between verses, songs, tracks, scenes, acts or movements in the item of dynamic content, may be identified as a reference point. With reference to FIG. 4D, presentation positions of an audiobook that fall between silent intervals may be identified as chapter breaks. Accordingly, the presentation position 462A that falls between the second and third silent intervals in an audiobook may be identified as a subdivision 462B corresponding to Chapter 2, while the presentation position 464A that falls between the fourth and fifth silent intervals in the audiobook may be identified as a subdivision 464B corresponding to Chapter 4.

In other embodiments, the content navigation service analyzes video in the item of dynamic content to identify reference points that provide boundaries for a content subdivision. For example, the content navigation service may perform image analysis on video provided in the item of dynamic content to identify a presentation position in the item of dynamic content at which the video is substantially dark or empty, which may indicate a transition between scenes. For instance, a television program may include one or more dark frames between scenes. These frames may accordingly be marked as a reference point, which may represent the boundary of a scene subdivision.

Image analysis may also be performed to identify subdivisions in sporting events presented visually. This image analysis may exploit conventions in the visual presentation of sporting events to identify subdivisions in sporting events. For example, in television presentations of many sporting events, a display element (such as a score bug, score banner, or score bar) indicates the current score and the current subdivision of the sporting event (e.g., the current quarter, half, period, inning, heat, game, set, balls and strikes, pitch count, overtime, golf holes, bowling frame, etc.). Frames with ordinal numbers in common may be identified as belonging to the same subdivision. The first frame and last frame at which a particular ordinal number appears may represent the boundaries of the subdivision.

For example, to identify a quarter of a basketball game, the content navigation service may use optical character recognition on a score bar of the basketball game. One or more frames at the presentation position 472A may include characters corresponding to the ordinal number "2nd." Accordingly, the presentation position 472A may be associated with the second quarter subdivision 472B. Likewise, one or more frames at the presentation position 474A may include characters on the score bar that read "1st OT." Accordingly, the presentation position 474A may be associated with the first overtime subdivision 474B.

Visual presentations of many sporting events follow other repetitive patterns as well. For example, for football games, the camera is usually positioned perpendicular to the sidelines at the beginning of each play. Likewise, the down linemen remain still for several frames before the football is snapped for each play. For baseball games, the camera is usually positioned behind the pitcher before each pitch is thrown, and the catcher and umpire remain relatively still as the baseball is pitched. In tennis matches, the camera is often positioned behind the player serving the ball right before he or she serves the ball. Images of the sporting event may be compared to reference images corresponding to these repetitive patterns to identify subdivisions of the sporting event corresponding to plays or pitches, for example. Input from the human interaction task system 108 may also be obtained to identify subdivisions in sporting events.

In addition to the imaging-based techniques described above for identifying structural subdivisions in a sporting event, content elements corresponding to specific events within the sporting event (e.g., goals, runs, hits, big plays, dunks, etc.) may be identified based at least in part on audio content that may be provided with the sporting event (e.g., as color commentary or crowd noise included in a television or radio broadcast). In one embodiment, the content navigation service maintains a list of keywords or keyphrases corresponding to specific events in the sporting event. The content navigation service may transcribe audio commentary of the sporting event, and then identify keywords or keyphrases in the transcription. The position of the keywords in the transcription may then be used to identify a corresponding presentation position in the sporting event at which the event occurred. For example, audio commentary of a soccer (association football) match may include an announcer yelling "GOAL!" when a goal is scored, while audio commentary of an American football game may include an announcer saying "He split the uprights!" or "It's good!" when a field goal or extra point is made. The content navigation service may also maintain a list of known catchphrases associated with specific commentators, and may associate those catchphrases with specific events. In an illustrative example, the football announcer Chris Berman (currently with ESPN® of Bristol, Conn.) will often say, "He could go all the way!" before a player scores a touchdown. Accordingly, the content navigation service may determine when a keyword, keyphrase, or catchphrase is spoken by a commentator, and associate the keyword, keyphrase, or catchphrase with a particular presentation position of the sporting event. The content navigation service may accordingly assign a content element corresponding to the specific event to the presentation position of the sporting event. The content navigation service may also identify specific events in a sporting event by analyzing crowd noise (e.g., associating presentation positions at which cheering occurs with a content element at which a goal, dunk, touchdown, home run, etc. occurs, or associating a presentation position at which booing occurs with a content element in which poor officiating occurs).

Still further techniques for identifying content elements in sporting events are possible. For example, network-based content providers may provide companion textual content related to a sporting event in near-real time (an approach sometimes referred to as "liveblogging" or "gamecasting"). In one embodiment, text commentary from a network-based content provider is obtained by the content navigation service and analyzed for keywords, keyphrases, catchphrases, or metadata that indicates that a particular event has occurred at a particular time during the sporting event. The content navigation service may accordingly assign a content element corresponding to the particular event to the presentation position of the sporting event.

Other forms of network-based content may also be analyzed to identify the presentation position of events within sporting events. For example, network-based social networking communities may be analyzed to identify particular trends in content related to a particular athlete. In a particular, non-limiting example, names of soccer (association football) players often "trend" on network-based microblogging communities when an important event occurs during a soccer game (e.g., scoring a goal or receiving a red card). The content navigation service may determine a time at which a player's name "trended" and determine that a content element is present in the sporting event at or near the time at which the player's name began to "trend."

It will be appreciated that the techniques described above with reference to sporting events may be applied generally to any dynamic content for which commentary may be provided in audible and/or textual form, such as press conferences, product demonstrations, fashion shows, news broadcasts, talk shows, television shows, and the like.

Figure 5A:
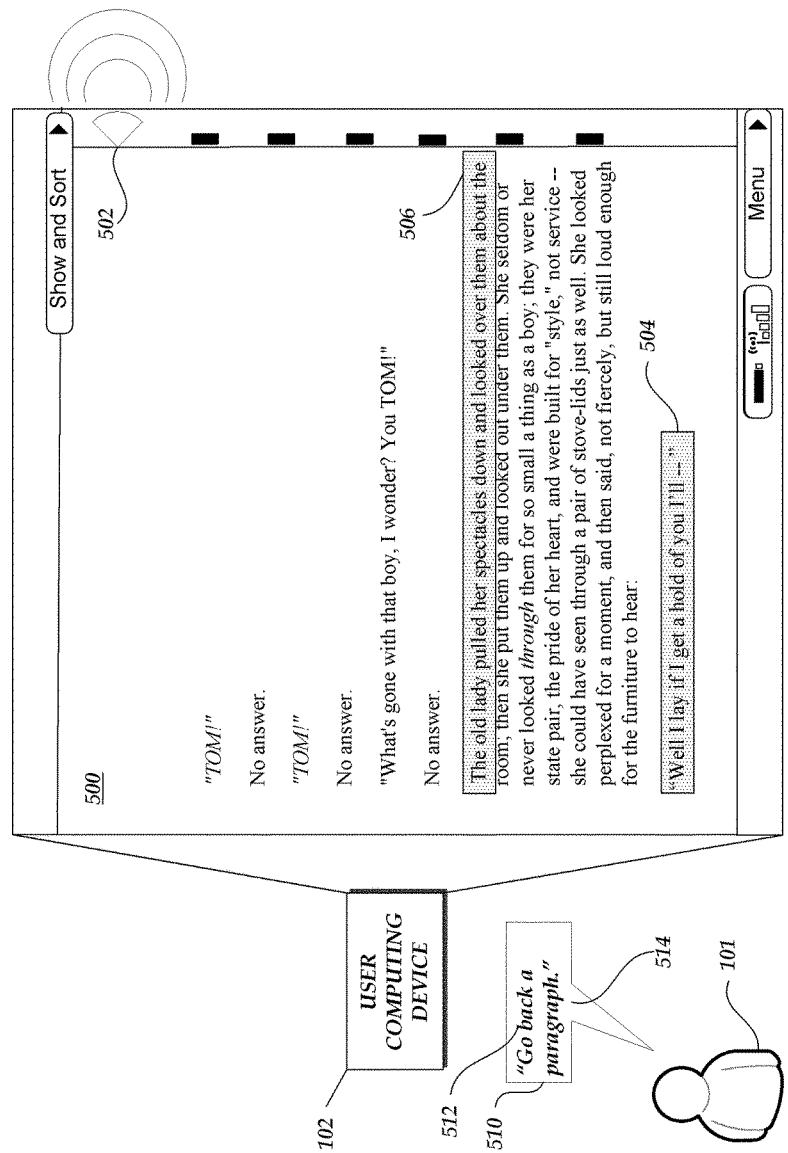
FIG. 5A, FIG. 5B, FIG. 5C and FIG. 5D are pictorial diagrams depicting illustrative operations of the content navigation service.

As discussed above, the content navigation service may process voice commands received from a user to facilitate the selection of a presentation position corresponding to a content element in an item of dynamic content. Turning to FIG. 5A., FIG. 5B, FIG. 5C and FIG. 5D, examples of voice commands that may be processed by the content navigation service and displayed on a user computing device 102 are depicted. As illustrated in FIG. 5A., FIG. 5B, FIG. 5C and FIG. 5D, in which identical reference numbers refer to similar or identical elements, the user computing device 102 may aurally present audio in an item of dynamic content via one or more speakers 502 and/or one or more audio outputs, which may be provided to speakers or headphones. The user computing device 102 may also display a companion item of textual content with which an item of dynamic content synchronized on the display 500. The user computing device 102 may also visually present video in an item of dynamic content via the display 500.

Figure 5B:
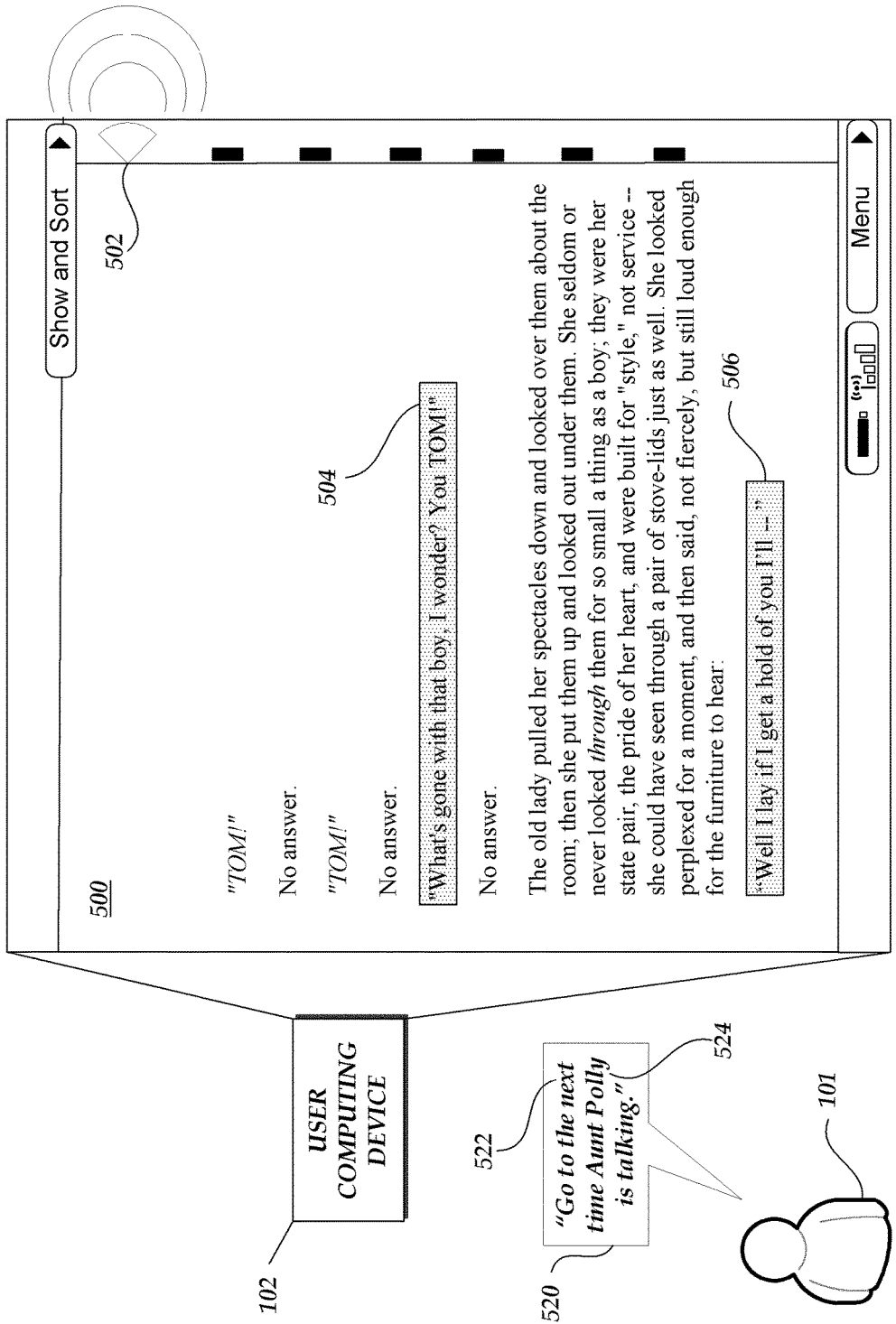
Figure 5C:
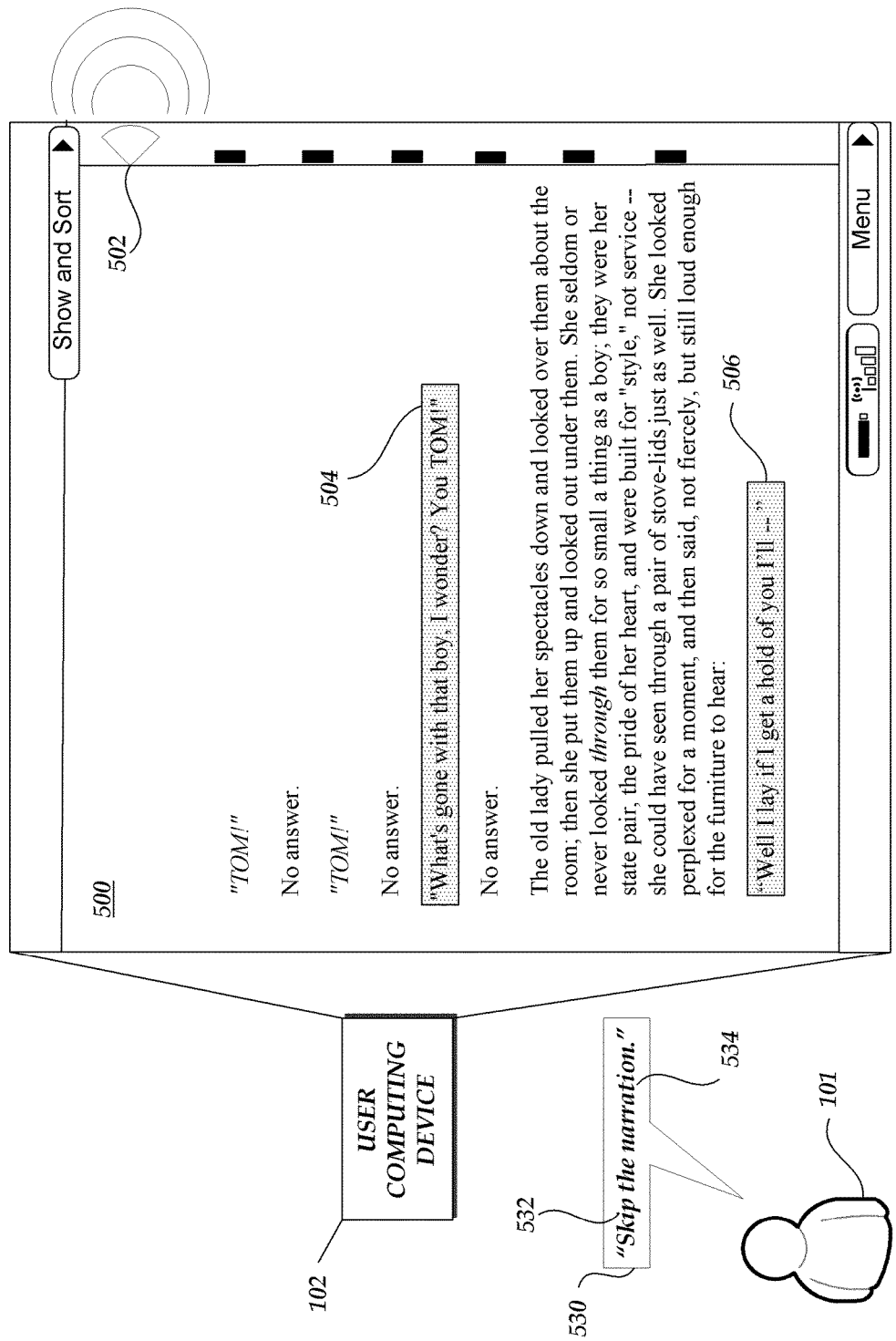
Figure 5D:
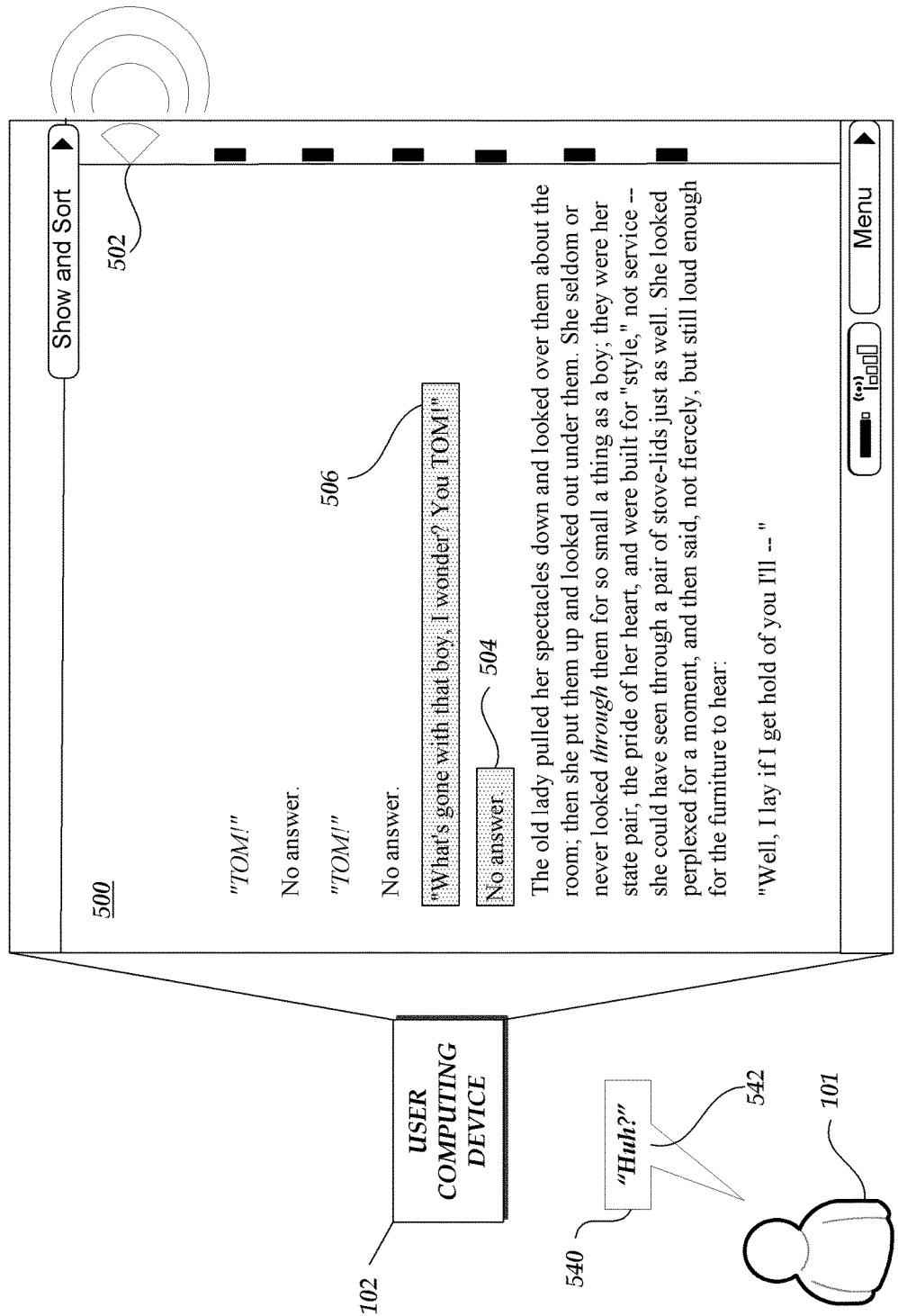

For illustrative purposes, the display 500 in FIG. 5A., FIG. 5B, FIG. 5C and FIG. 5D depicts the text at the beginning of "*The Adventures of Tom Sawyer*" so as to illustrate a current presentation position 504 in an audiobook of "*The Adventures of Tom Sawyer*" with reference to a destination presentation position 506 that may be specified by the voice command. It should be appreciated that the user computing device 102 need not display an item of textual content to which an item of dynamic content is synchronized. Rather, the user computing device may only present the item of dynamic content.

With specific reference to FIG. 5A, the user 101 may provide a structured voice command 510 that may be received by the user computing device 102 for processing by the content navigation service. The structured voice command includes a direction 512 relative to the current presentation position 504 of the item of dynamic content. The structured voice command also includes a content element 514 to which the user wishes to navigate, here, a syntactic structure corresponding to a paragraph prior to the current presentation position 504. Accordingly, the content navigation service may determine the desired destination presentation position 506 in the item of dynamic content and present the item of dynamic content starting at or near the destination presentation position 506.

With specific reference to FIG. 5B, the user 101 may provide an unstructured (or natural language) voice command 520 that may be received by the user computing device 102 for processing by the content navigation service. Natural language processing techniques may be used to identify a direction 522 and a content element 524 to which the user wishes to navigate. Here, the content element 524 may be identified as a syntactic structure corresponding to a line of dialogue spoken by a character ("the next time Aunt Polly is talking"). Accordingly, the content navigation service may determine the destination presentation position 506 of the content element 524 to which the user wishes to navigate and present the item of dynamic content starting at or near the destination presentation position 506. As discussed above, in some embodiments, the user computing device 102 processes the unstructured voice command 520, while in other embodiments, the user computing device 102 routes the unstructured voice command 520 to the content navigation server 110, which may determine an appropriate destination presentation position 506 specified in the unstructured navigation command.

With specific reference to FIG. 5C, the user 101 may provide a navigation command 530 that includes a particular standing rule 532 (skipping over presentation positions) for a specific type of content element 534 (syntactic structures that correspond to background narration). Accordingly, after the item of dynamic content is presented at the current presentation position 504, a syntactic structure corresponding to background narration (here, the "No answer" and "The old lady . . . " paragraphs) may be skipped over, such that the destination presentation position 506 lies after the presentation position of the syntactic structure to be skipped.

With specific reference to FIG. 5D, the user 101 may provide a navigation command 540 that includes an indication 542 that the user 101 is confused or perhaps did not understand or appreciate a recently-presented portion of the item of dynamic content. In some embodiments, if the user 101 indicates confusion in a voice command 540, the item of dynamic content jumps backward from the current presentation position 504 to a destination presentation position 506 that lies prior to the current presentation position 504. For example, the content navigation service may select a content element such as a syntactic structure corresponding to a prior sentence or paragraph, and designate the presentation position of that prior sentence or paragraph as the destination presentation position 506.

Figure 6:
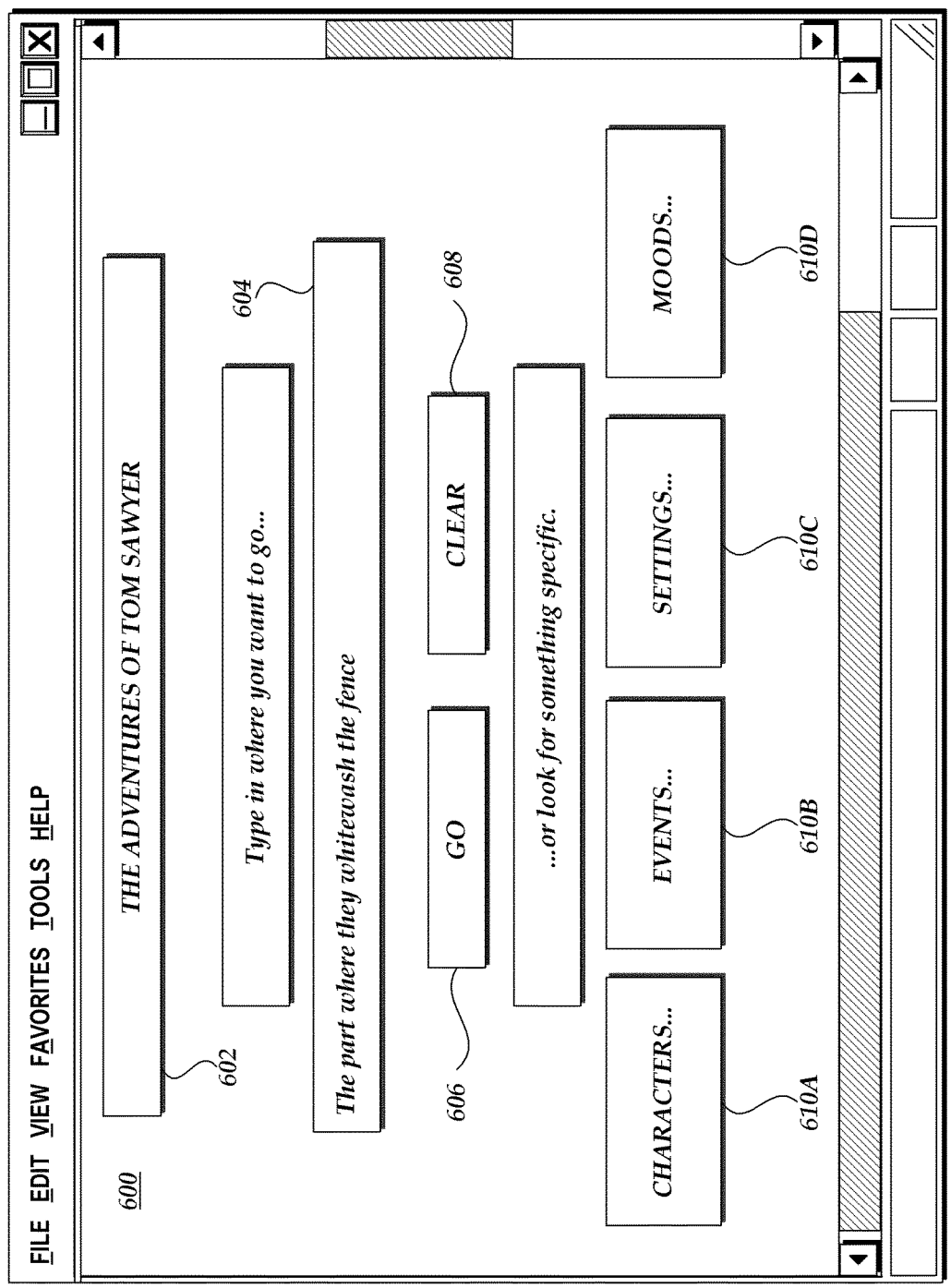
FIG. 6 is a pictorial diagram of an illustrative user interface for navigating an item of dynamic content.

The content navigation service may also (or instead) receive navigation commands through a user interface 600 as shown in FIG. 6. The user interface 600 may include a title indicator 602 that shows the name of the item of dynamic content to be navigated and presented. The user interface 600 may also include a search field 604 in which a user may type in a structured or unstructured navigation command and/or indicate a content element to which the user wishes to navigate. After entering a navigation command or content element to which the user desires to navigate, the user may interact with the go element 606. The item of dynamic content may then be presented from a destination presentation position determined by the navigation command or content element entered in the search field 604. The user may also interact with the clear element 608 to clear the search field 604. In addition to the search filed 604, the user may navigate the item of dynamic content based on content elements identified by the content navigation service. For example, the user may interact with the character user interface element 610A, upon which a list of characters and their associated presentation positions in the item of dynamic content may be displayed. Similar lists may be displayed for events, settings and moods, as shown by the user interface elements 610B, 610C and 610D. User interface elements for causing the display of a list of other types of content elements may also be provided (e.g., a paragraph user interface element for enabling the user to select a presentation position based on a paragraph-by-paragraph basis).

Many of the operations of the content navigation service are sufficiently mathematically or technically complex that one or more computing devices may be necessary to carry them out. For example, synchronizing text with dynamic content, transcribing digital audio to text, accessing and displaying content pages over a network, identifying content elements in an item of dynamic content, identifying content elements in a synchronized companion item of textual content and other operations of the content navigation service effectively require resort to one or more computing devices. Additionally, a computing device may be required to present an item of digital content, as discussed above.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for navigating an item of audio content, the computer-implemented method comprising:
   as implemented by one or more computing devices configured with specific computer-executable instructions,
      obtaining synchronization information regarding the item of audio content and an item of textual content that is a companion to the item of audio content, wherein the synchronization information associates individual positions, in the item of textual content, with respective individual positions in the item of audio content;
      receiving a command to navigate to a desired position in the item of audio content, wherein the desired position is specified in the command relative to a current output position in the item of audio content and with reference in the command to a grammatical syntax structure within the item of textual content;
      determining, from at least the synchronization information, a first position in the item of textual content that corresponds to a current output position of the item of audio content;
      determining a second position in the item of textual content relative to the first position in the item of textual content, wherein the second position is identified by the grammatical syntax structure referenced in the command;
      determining, from at least the synchronization information, a navigation position in the item of audio content that corresponds to the second position in the item of textual content; and
      providing, to a computing device configured to present the item of audio content, an indication that the desired position is the navigation position.

2. The computer-implemented method of claim 1 further comprising causing the computing device to present the item of audio content from the navigation position.

3. The computer-implemented method of claim 2 further comprising causing the computing device to present a summary of a portion of the item of audio content, wherein the portion occurs between the current output position and the navigation position.

4. The computer-implemented method of claim 1 further comprising generating the synchronization information.

5. A system for navigating content, the system comprising:
   an electronic data store configured to store:
      an item of dynamic content; and
      synchronization information regarding the item of dynamic content and an item of textual content that is a companion to the item of dynamic content, wherein the synchronization information associates individual positions, in the item of textual content, with respective individual positions in the item of dynamic content; and
   a computing device in communication with the electronic data store, the computing device being configured to:
      receive a command to navigate to a desired position in the item of dynamic content, wherein the desired position is specified in the command relative to a current output position in the item of dynamic content and with reference in the command to a grammatical syntax within the item of textual content;
      determine, from at least the synchronization information, a first position in the item of textual content that corresponds to a current output position of the item of dynamic content;
      determine a second position in the item of textual content relative to the first position in the item of textual content, wherein the second position is identified by the grammatical syntax structure referenced in the command;
      determine, from at least the synchronization information, a navigation position in the item of dynamic content that corresponds to the second position in the item of textual content;
      receive input indicating a selection of the navigation position in the item of dynamic content; and
      cause output of the item of dynamic content to begin from the navigation position in the item of dynamic content.

6. The system of claim 5, wherein the navigation position in the item of dynamic content is near a representation of the grammatical syntax within the dynamic content.

7. The system of claim 5, wherein the computing device is configured to cause output of the item of dynamic content to begin from the navigation position by at least:
   providing, to a recipient computing device, an indication that the desired position in the item of dynamic content is the navigation position in the item of dynamic content; and
   causing the recipient computing device to begin output of the item of dynamic content from the navigation position in the item of dynamic content.

8. The system of claim 5, wherein the computing device is further configured to cause presentation of a user interface comprising a search field, and wherein the command is received via the search field.

9. The system of claim 8, wherein:
   the user interface further comprises a user interface element identifying the navigation position; and
   the input is received in response to a user's interaction with the user interface element.

10. The system of claim 5, wherein the command comprises a structured command.

11. The system of claim 5, wherein the command comprises a natural language command.

12. The system of claim 5, wherein the computing device is further configured to determine the second position in the item of textual content relative to the first position in the item of textual content at least partly by determining that the second position occurs in the item of textual content before any additional positions within the item of textual content that are also identified by the grammatical syntax structure referenced in the command.

13. The system of claim 5, wherein the computing device is further configured to determine that the navigation position occurs after the current output position.

14. The system of claim 5, wherein the computing device is further configured to:
   determine that the navigation position occurs before the current output position; and
   request a new command to navigate to a desired position in the item of dynamic content.

15. A system comprising:
   one or more computing devices configured with specific computer-executable instructions that, when executed, cause the one or more computing devices to at least:
      obtain synchronization information regarding an item of dynamic content and an item of textual content that is a companion to the item of dynamic content, wherein the synchronization information associates positions, within the item of textual content, with corresponding positions in the item of dynamic content;
      receive a command to navigate to a desired position within the item of dynamic content, wherein the desired position is specified relative to a current output position in the item of dynamic content and with reference to a grammatical syntax within the item of textual content;
      determine, from at least the synchronization information, a first position in the item of textual content that corresponds to a current output position of the item of dynamic content;
      determine a second position in the item of textual content, relative to the first position in the item of textual content, in the item of textual content that is identified by the grammatical syntax structure referenced in the command;
      determine, from at least the synchronization information, a navigation position in the item of dynamic content that corresponds to the second position in the item of textual content; and
      transmit the navigation position to a playback device configured to present the item of dynamic content.

16. The system of claim 15, wherein the specific computer-executable instructions further cause the one or more computing devices to at least:
   present a user interface identifying the navigation position; and
   receive input to the user interface indicating a selection of the navigation position.

17. The system of claim 15, wherein the computer-executable instructions further cause the one or more computing devices to at least cause the playback device to present the item of dynamic content from the navigation position.

18. Non-transitory computer-readable media including computer-executable instructions that, when executed by one or more computing devices, cause the one or more computing devices to at least:
   obtain synchronization information regarding an item of dynamic content and an item of textual content that is a companion to the item of dynamic content, wherein the synchronization information associates individual positions, in the item of textual content, with respective individual positions in the item of dynamic content;
   receive a command to navigate to a desired position within the item of dynamic content, wherein the desired position is specified in the command relative to a current output position in the item of dynamic content and with reference in the command to a grammatical syntax within the item of textual content;
   determine, from at least the synchronization information, a first position in the item of textual content that corresponds to a current output position of the item of dynamic content;
   determine a second position in the item of textual content relative to the first position in the item of textual content, wherein the second position is identified by the grammatical syntax structure referenced in the command;
   determine, from at least the synchronization information, a navigation position in the item of dynamic content that corresponds to the second position in the item of textual content; and
   transmit the navigation position to a playback device configured to present the item of dynamic content.

19. The non-transitory computer-readable media of claim 18, wherein the computer-executable instructions further cause the one or more computing devices to at least:
   present a user interface identifying the navigation position; and
   receive input to the user interface indicating a selection of the navigation position.

20. The non-transitory computer-readable media of claim 18, wherein the computer-executable instructions further cause the one or more computing devices to at least cause the playback device to present the item of dynamic content from the navigation position.

21. The non-transitory computer-readable media of claim 18, wherein the computer-executable instructions further cause the one or more computing devices to at least determine that the desired position is valid based at least in part on determining that the navigation position occurs later in the item of dynamic content than the current output position of the item of dynamic content.

* * * * *